United States Patent
Uesaka et al.

(10) Patent No.: US 11,310,769 B2
(45) Date of Patent: Apr. 19, 2022

(54) METHOD, APPARATUS, AND COMPUTER-READABLE MEDIUM FOR ENHANCED DECODING OF NARROWBAND MASTER INFORMATION BLOCKS (MIB-NB)

(71) Applicant: Telefonaktiebolaget LM Ericsson (publ), Stockholm (SE)

(72) Inventors: Kazuyoshi Uesaka, Kawasaki (JP); Muhammad Kazmi, Sundbyberg (SE); Santhan Thangarasa, Vällingby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 117 days.

(21) Appl. No.: 16/644,289

(22) PCT Filed: Oct. 2, 2018

(86) PCT No.: PCT/SE2018/051009
§ 371 (c)(1),
(2) Date: Mar. 4, 2020

(87) PCT Pub. No.: WO2019/070187
PCT Pub. Date: Apr. 11, 2019

(65) Prior Publication Data
US 2021/0068075 A1  Mar. 4, 2021

Related U.S. Application Data

(60) Provisional application No. 62/566,752, filed on Oct. 2, 2017.

(51) Int. Cl.
*H04W 4/00* (2018.01)
*H04W 72/00* (2009.01)
(Continued)

(52) U.S. Cl.
CPC ............. *H04W 72/005* (2013.01); *H04L 1/08* (2013.01); *G16Y 10/75* (2020.01); *H04W 4/70* (2018.02)

(58) Field of Classification Search
CPC ..... H04W 72/005; H04W 4/70; H04W 48/10; H04L 1/08; H04L 2001/0093; H04L 1/1845; H04L 1/0067; G16Y 10/75
(Continued)

(56) References Cited

U.S. PATENT DOCUMENTS

| | | | |
|---|---|---|---|
| 2014/0198685 A1* | 7/2014 | Xu | H04W 48/16 370/254 |
| 2015/0085717 A1* | 3/2015 | Papasakellariou | H04L 5/0044 370/280 |

(Continued)

FOREIGN PATENT DOCUMENTS

WO  2017119843 A1  7/2017

OTHER PUBLICATIONS

"3GPP TS 36.213 V14.4.0", 3rd Generation Partnership Project; Technical Specification Group Radio Access Network; Evolved Universal Terrestrial Radio Access (E-UTRA); Physical layer procedure(Release 14), Sep. 2017, pp. 1-462.
(Continued)

*Primary Examiner* — Chuong T Ho
(74) *Attorney, Agent, or Firm* — Christopher & Weisberg, P.A.

(57) ABSTRACT

Exemplary embodiments include methods and/or procedures for operating a wireless device (420, 1210) in communication with a first network node. Exemplary embodiments include receiving (902), from the first network node, an indication of at least one repetition method used in a broadcast channel transmitted by a second network node (401, 1260), wherein the repetition method comprises: a first
(Continued)

portion of an information block in first resources of the broadcast channel that are reserved for the information block; and a second portion of the information block, comprising at least a subset of the first portion, in second resources of the broadcast channel that are different from the first resources. Exemplary embodiments also include receiving (904) the broadcast channel transmitted by the second network node, and decoding (906) the information block by combining the first portion and the second portion. Exemplary embodiments also include complementary methods and/or procedures performed by first and second network nodes, as well as wireless devices, network nodes, and computer-readable media configured in accordance with the exemplary methods and/or procedures.

15 Claims, 15 Drawing Sheets

(51) Int. Cl.
*H04L 1/08* (2006.01)
*H04W 4/70* (2018.01)
*G16Y 10/75* (2020.01)

(58) Field of Classification Search
USPC .................................................. 370/329, 330
See application file for complete search history.

(56) References Cited

U.S. PATENT DOCUMENTS

| 2015/0085795 | A1 | 3/2015 | Papasakellariou et al. |
| 2016/0150506 | A1 | 5/2016 | Tabet et al. |
| 2016/0212636 | A1 | 7/2016 | Dimou et al. |
| 2017/0180095 | A1 | 6/2017 | Xue et al. |
| 2020/0021998 | A1* | 1/2020 | Baldemair ............ H04W 16/14 |
| 2020/0107247 | A1* | 4/2020 | Ioffe .................... H04W 76/10 |

OTHER PUBLICATIONS

"3GPP Ts 36.331 V14.4.0"; 3rd Generation Partnership Project; Technical Specification Group Radio Access Network Evolved Universal Terrestrial Radio Access (E-UTRA); Radio Resource Control (RRC); Protocol specification (Release 14); Sep. 2017, pp. 1-753.

* cited by examiner

| Network signaling *ParameterName* | Repetition method |
|---|---|
| '00' | No repetition |
| '01' | Repetition method #1 |
| '10' | Repetition method #2 |
| '11' | Repetition method #3 (if any) |

FIG. 7

| Network signaling *ParameterName* | Repetition method | Conditions/scenarios for applying the method |
|---|---|---|
| '00' | No repetition | In any scenario/condition |
| '01' | Repetition method #1 | In both normal and enhanced coverage |
| '10' | Repetition method #2 | In enhanced coverage and/or when UE speed is above speed threshold |
| '11' | Repetition method #3 (if any) | Enhanced coverage but any UE speed |

FIG. 8

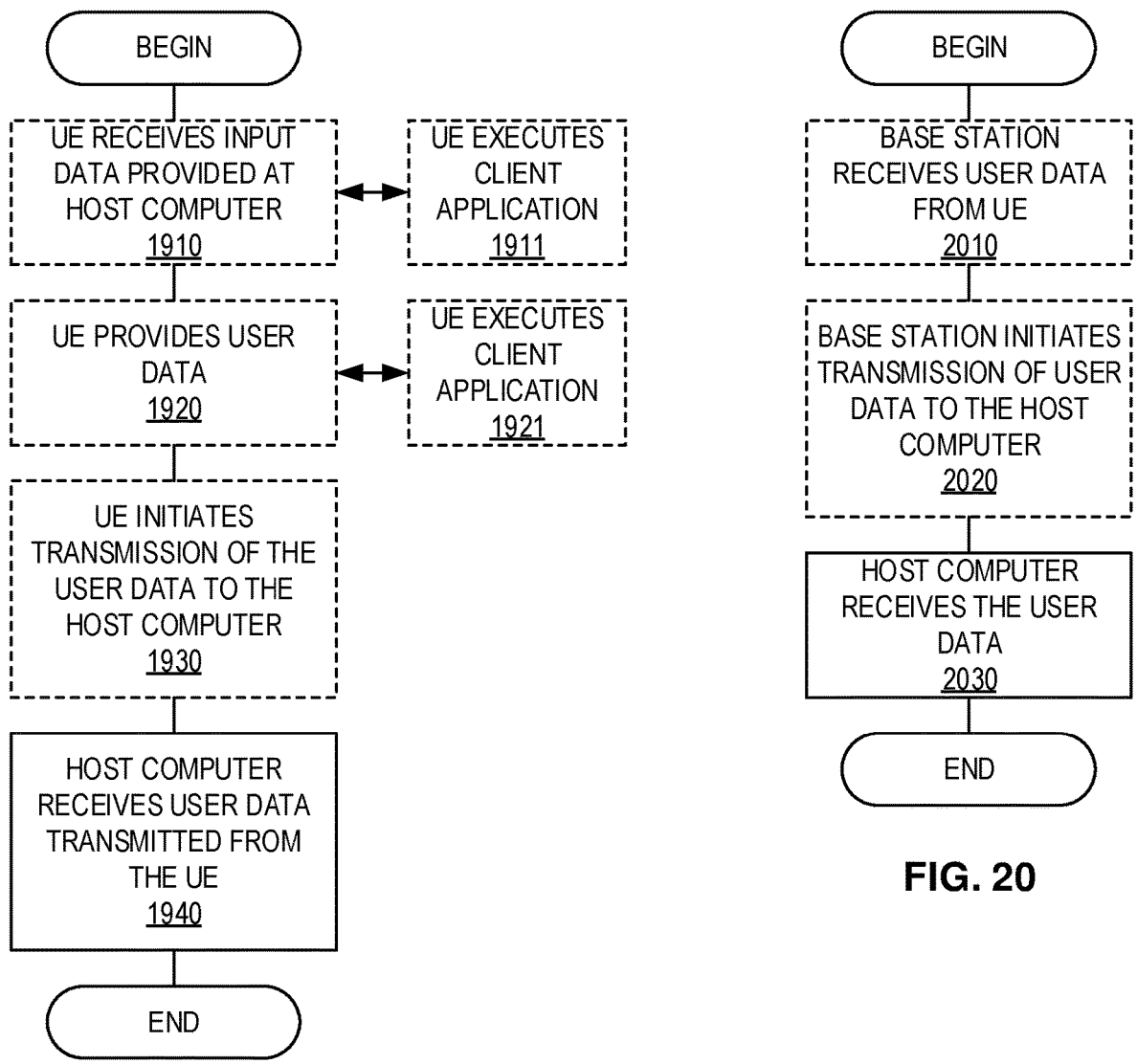

METHOD, APPARATUS, AND COMPUTER-READABLE MEDIUM FOR ENHANCED DECODING OF NARROWBAND MASTER INFORMATION BLOCKS (MIB-NB)

TECHNICAL FIELD

The present application relates generally to the field of wireless communications, and more specifically to the improving the reception of a broadcast channel by Narrowband Internet-of-Things (NB-IoT) wireless devices operating in very-low-signal environments.

INTRODUCTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Cellular communication systems are currently being developed and improved for machine type communication (MTC), which is characterized by lower demands on data rates (e.g., compared to mobile broadband) but with higher requirements on factors such as device cost/complexity, improved coverage and/or reliability, lower latency, and ability to operate for a long time (e.g., months or years) without charging or replacing device batteries. MTC is also commonly referred to as Internet of Things (IoT), machine-to-machine (M2M) communication, or Low Power Wide Area (LPWA), and the term "IoT" will be used herein to refer to these use cases. However, IoT can also refer to use cases involving communications between machines and humans.

IoT communication can comprise of exchange of data, signaling, measurement data, configuration information, etc. IoT communication devices can deployed in many different applications and platforms and can range in size from very small (e.g., smaller than a traditional cellular phone) to very large (e.g., a base station). IoT devices are often used for applications involving ensing environmental conditions (e.g. temperature reading), metering or measurement (e.g. electricity usage etc.), fault finding or error detection, transportation (e.g., vehicle tracking), etc. In these applications, the IoT devices are often installed on poor signal area such as basements, tunnels, etc.

There have been recent developments in 3GPP specifying technologies to cover Machine-to-Machine (M2M) and/or Internet of Things (IoT) related use cases. Most recent work for 3GPP Release 13 and 14 includes enhancements to support Machine-Type Communications (MTC) with new user equipment (UE) categories (Cat-M1, Cat-M2), supporting reduced a bandwidth of 6 physical resource blocks (PRBs) (up to 24 PRBs for Cat-M2), and Narrowband IoT (NB-IoT) UEs providing a new radio interface (and UE categories, Cat-NB1 and Cat-NB2). LTE enhancements introduced in 3GPP Releases 13,14 and 15 for MTC are referred to as "eMTC" and include support for bandwidth limited UEs, Cat-M1, and support for coverage enhancements. This is to separate from discussion of NB-IoT (notation here used for any Release), although the supported features are similar on a general level.

Narrow Band Internet of Things (NB-IoT) is a radio access for cellular IoT based to a great extent on a non-backward-compatible variant of the current Long Term Evolution (LTE) radio access technology. NB-IoT provides improved indoor coverage, support for massive number of low throughput devices, low delay sensitivity, ultra-low device cost, low device power consumption and (optimized) network architecture. NB-IoT is designed to reuse the LTE system as much as possible especially higher layer signaling, and is also designed be able to replace with the existing GSM system. Therefore it only uses one (1) physical radio block (PRB) having 180-kHz bandwidth.

NB-IoT can be deployed as a standalone carrier (standalone operation). It can also be deployed within the LTE spectrum, either inside an LTE carrier (in-band operation) or in the guard band between carriers (guard-band operation). The deployment scenario, standalone, in-band, or guard-band, however, should be transparent to a user equipment (UE) when it is first turned on and it searches for an NB-IoT carrier. The deployment mode is signaled via the Master Information Block for NB-IoT (MIB-NB) on the Narrowband physical broadcast channel (NPBCH). Since a UE is unaware of the deployment mode when it attempts to decode MIB-NB in NPBCH, the NPBCH physical structure is common for the deployment modes.

FIG. 1 illustrates an exemplary physical layer (PHY) structure for NPBCH. NB-IoT is designed to operate by replacing one (1) LTE PRB, which consists of 12 subcarriers across 14 consecutive OFDM symbols. However, NPBCH cannot use certain resource elements (REs) in the PRB that are used for transmitting LTE reference signals (e.g., CRS 0-3 shown in FIG. 1). Likewise, NPBCH also includes non-data-bearing reference signals (NRS) that are used for channel estimation, demodulation of NPBCH data-bearing symbols, and mobility measurements (e.g. NRSRP, NRSRQ, etc.).

Moreover, NPBCH presently does not use the first three symbols (i.e., 0, 1, and 2) because these are normally used by LTE PDCCH and PCFICH if NB-IoT is deployed in-band in this manner. Even though LTE can use between the first one and the first four symbols in a PRB depends on the LTE system bandwidth and an eNB setting, NB-IoT UE cannot access the LTE system information and therefore assumes the first three (3) symbols are reserved for PDCCH/PCFICH. These limitations result in a total of 100 REs available for NPBCH data in symbols 3-13 of each PRB.

In this available bandwidth, NPBCH broadcasts the Narrowband Master Information Block (MIB-NB) that provides the essential NB-IoT system information such as deployment mode, scheduling information for other NB-IoT system information not carried by MIB-NB, and the current system frame number (SFN). NPBCH is transmitted in subframe 0 of every 10-ms frame, as shown in FIG. 2. Each subframe is 1-ms in duration. One MIB-NB is mapped to 800 NPBCH symbols after channel coding, rate matching, modulating, and scrambling. Since NPBCH transmits only 100 symbols per subframe (i.e., one per each of the 100 available REs), the MIB-NB symbols are divided into eight (8) self-decodable portions or subblocks. To support NB-IoT UEs deployed in poor coverage areas (e.g., basement), each subblock is repeated eight times in eight consecutive NPBCH subframes. In total, an eNB does not change the contents of MIB-NB for a duration of 640 ms (80 ms×8 repetitions), i.e., the MIB-NB transmission time interval (TTI) is 640 ms.

SUMMARY

Exemplary embodiments of the present disclosure include methods and/or procedures performed by a wireless device (e.g., a UE) in communication with a first network node (e.g., eNB, base station, etc.). The exemplary methods and/or procedures can include receiving, from the first network node, an indication of at least one repetition method used in a broadcast channel transmitted by a second network node. In some exemplary embodiments, the repetition method can comprise a first portion of an information block in first resources of the broadcast channel that are reserved for the information block, and a second portion, comprising at least a subset of the first portion, in second resources of the broadcast channel that are different from the first resources.

The exemplary methods and/or procedures can also include receiving the broadcast channel transmitted by the second network node in accordance with the indicated repetition method. The exemplary methods and/or procedures can also include decoding the information block by combining the first portion and the second portion. In some exemplary embodiments, the first portion and the second portion are rate-matched before combining. In some embodiments, the exemplary methods and/or procedures can also include performing one or more measurements related to the second network node (e.g., subsequent to decoding the information block), and transmitting information concerning the one or more measurements to the first network node.

Exemplary embodiments also include methods and/or procedures performed by a first network node (e.g., eNB, base station, etc.) in communication with a wireless device (e.g., UE). The exemplary methods and/or procedures can include determining at least one repetition method used in a broadcast channel transmitted by a second network node. In some exemplary embodiments, the repetition method can comprise a first portion of an information block in first resources of the broadcast channel that are reserved for the information block, and a second portion, comprising at least a subset of the first portion, in second resources of the broadcast channel that are different from the first resources.

The exemplary methods and/or procedures can also include sending, to the wireless device, an indication of the at least one repetition method. In some exemplary embodiments, sending the indication of the at least one repetition method can be based on enhanced coverage with respect to the wireless device. In some exemplary embodiments, sending the indication of the at least one repetition method can be based on an expected mobility for the wireless device. The exemplary methods and/or procedures can also include receiving information concerning one or more measurements, related to the second network node, made by the wireless device subsequent to acquiring the information broadcast by the second network node.

Exemplary embodiments also include methods and/or procedures performed by a second network node (e.g., eNB, base station, etc.) for transmitting a broadcast channel. The exemplary methods and/or procedures can include selecting a first repetition method for transmitting the broadcast channel. The repetition method can comprise a first portion of an information block in first resources of the broadcast channel that are reserved for the information block, and a second portion, comprising at least a subset of the first portion, in second resources of the broadcast channel that are different from the first resources.

In some exemplary embodiments, selecting the first repetition method can be based on enhanced coverage with respect to the wireless device, e.g., a more robust repetition method is selected for greater enhanced coverage.

The exemplary methods and/or procedures can also include sending, to a first network node, an indication of the first repetition method. The exemplary methods and/or procedures can also include transmitting the broadcast channel in accordance with the first repetition method. In some embodiments, the exemplary methods and/or procedures can also include refraining from transmitting one or more further channels in the second resources. For example, the second network node can refrain from transmitting LTE PDCCH that would otherwise utilize the second resources.

In some exemplary embodiments, the second resources are not reserved for the information block. In some exemplary embodiments, the broadcast channel can be a narrowband physical broadcast channel (NPBCH), the information block can be a narrowband master information block (MIB-NB), the first resources can comprise at least a portion of symbols 3-13 of a physical resource block (PRB), and the second resources can comprise at least a portion of symbols 0-2 of the PRB.

In some exemplary embodiments, the first repetition method comprises repeating a subset of the first portion of the MIB-NB in the second resources. In some exemplary embodiments, the first repetition method comprises the first portion of the MIB-NB coded at a first rate, the second portion comprises the first portion of the MIB-NB coded at a second rate greater than the first rate, and repeating the first portion of the MIB-NB coded at the second rate in the second resources.

In some exemplary embodiments, the indication can comprise a multi-bit field that indicates one of a plurality of available repetition methods.

Exemplary embodiments also include wireless devices (e.g., UEs) or network nodes (e.g., base stations) configured to perform the operations of the above-described exemplary methods and/or procedures, as well as non-transitory, computer-readable media storing instructions that, when executed by a processor, embody the operations of the above-described methods and/or procedures.

BRIEF DESCRIPTION OF THE DRAWINGS

The following Figures illustrate various exemplary aspects of embodiments disclosed herein:

FIG. 7 shows an exemplary predefined repetition signalling scheme in tabular form, according to various exemplary embodiments of the present disclosure;

FIG. 8 illustrates exemplary conditions under which the UE can apply the various repetition methods signalled according the exemplary technique shown in FIG. 7, according to various exemplary embodiments of the present disclosure;

FIG. 17-20 are flow diagrams illustrating various exemplary methods and/or procedures implemented in a communication system, according to various exemplary embodiments of the present disclosure.

DETAILED DESCRIPTION

Figure 1:
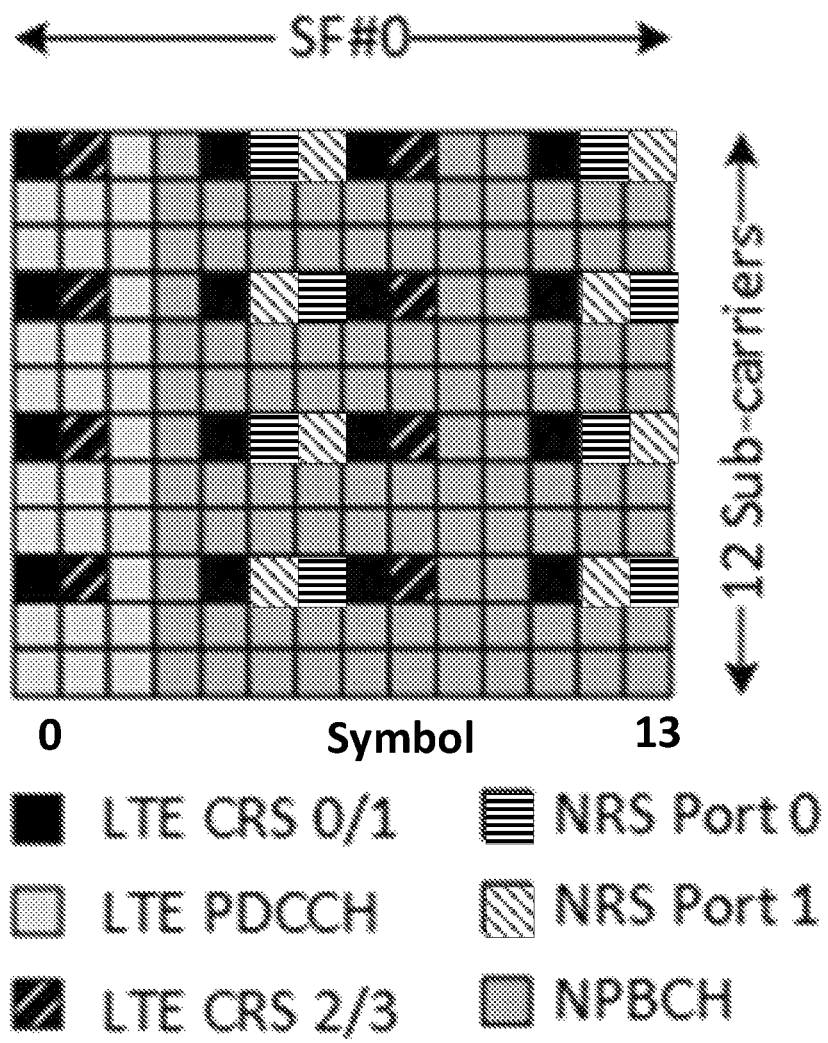
FIG. 1 illustrates an exemplary physical layer (PHY) structure for a narrowband physical broadcast channel (NPBCH)

Exemplary embodiments briefly summarized above will now be described more fully with reference to the accompanying drawings. These descriptions are provided by way of example to explain the subject matter to those skilled in the art, and should not be construed as limiting the scope of the subject matter to only the embodiments described herein. More specifically, examples are provided below that illustrate the operation of various embodiments according to the advantages discussed above.

In the following descriptions, the terms "UE" and "wireless device" are used interchangeably. Unless otherwise noted, a UE can be any type of wireless device capable of communicating with network node or another UE over radio signals. The UE can also be a radio communication device, target device, device to device (D2D) UE, machine-type UE, UE capable of machine-to-machine communication (M2M) or machine type communication (MTC), UE category narrow band 1 (NB1), UE category NB2, UE category M1, UE category M2, low-cost and/or low-complexity UE, a sensor equipped with UE, tablet, mobile terminal, smart phone, laptop embedded equipped (LEE), laptop mounted equipment (LME), USB dongles, Customer Premises Equipment (CPE), etc.

In the following descriptions, the terms "network node" and "radio network node" are used interchangeably. Unless otherwise noted, a network node can be any type of base station, radio base station, base transceiver station, base station controller, network controller, RNC, evolved Node B (eNB), Node B, Multi-cell/multicast Coordination Entity (MCE), relay node, access point, radio access point, Remote Radio Unit (RRU) Remote Radio Head (RRH).

In the following descriptions, the term "physical channel" is used to describe a set of resource elements (REs) carrying information originating from higher layers, e.g., transport channel, RRC message, etc. Examples of downlink physical channels are Physical Downlink Shared Channel (PDSCH), Physical Broadcast Channel (PBCH), Physical Multicast Channel (PMCH), Physical Control Format Indicator Channel (PCFICH), Physical Downlink Control Channel (PDCCH), Physical Hybrid ARQ Indicator Channel (PHICH), Enhanced Physical Downlink Control Channel (EPDCCH), MPDCCH, NPDCCH, NPDSCH, NPBCH etc. System information such as system information broadcast (SIB1bis) may also be transmitted over physical channel such as PDSCH, NPSDCH etc.

In the following descriptions, the term "repetition" is used in relation to a signal or channel to refer to transmitting at least two substantially identical signals in different time resources, e.g., in different subframes. Examples of signals are physical signals (e.g., CRS, PSS, SSS, NRS, NPSS, NSSS etc.) and physical channels (e.g., PDCCH, ePDCCH, NPDCCH, MPDCCH, NPDSCH, PDSCH, PBCH, NPBCH, PUCCH, PUSCH, NPUCCH, NPUSCH, etc.). The radio node (e.g., UE or network node) decodes the channel (e.g., NPBCH) transmitted with repetition after receiving first transmission of the channel and one or more retransmissions of the same channel.

A UE can operate under either normal coverage or enhanced coverage with respect to a particular cell (e.g., serving cell, neighbor cell, reference cell, etc.). The enhanced coverage is also referred to as extended coverage, coverage enhancement level, etc. The UE can also operate in plurality of coverage levels, e.g., normal coverage, enhanced coverage level 1, enhanced coverage level 2, etc. The coverage level may be expressed in terms of:

received signal quality and/or received signal strength at the UE with respect to a particular cell (e.g., serving cell, neighbor cell, reference cell, etc.); and/or received signal quality and/or received signal strength at the cell with respect to the UE.

Examples of signal quality metrics are SNR, SINR, CQI, RSRQ, NRSRQ, Ês/Iot etc. Examples of signal strength metrics are path loss, RSRP, NRSRP etc. Consider an example of two coverage levels or modes defined with respect to signal quality (e.g. SNR) at the UE comprising of:

Coverage enhancement level 1 (CE1) comprising of SNR≥−6 dB at UE with respect to a reference cell; and Coverage enhancement level 2 (CE2) comprising of −15 dB≤SNR<−6 dB at UE with respect to a reference cell.

Examples of the reference cells are serving cell of the UE, neighboring cell of the UE, etc. Examples of serving cell are PCell, PSCell, SCell, etc. In some situations, a UE can be configured with PCell and PSCell or with PCell, PSCell and one or more SCells such as in carrier aggregation or dual connectivity. The configured cells are UE-specific, e.g., serving cells of the UE.

Figure 3:
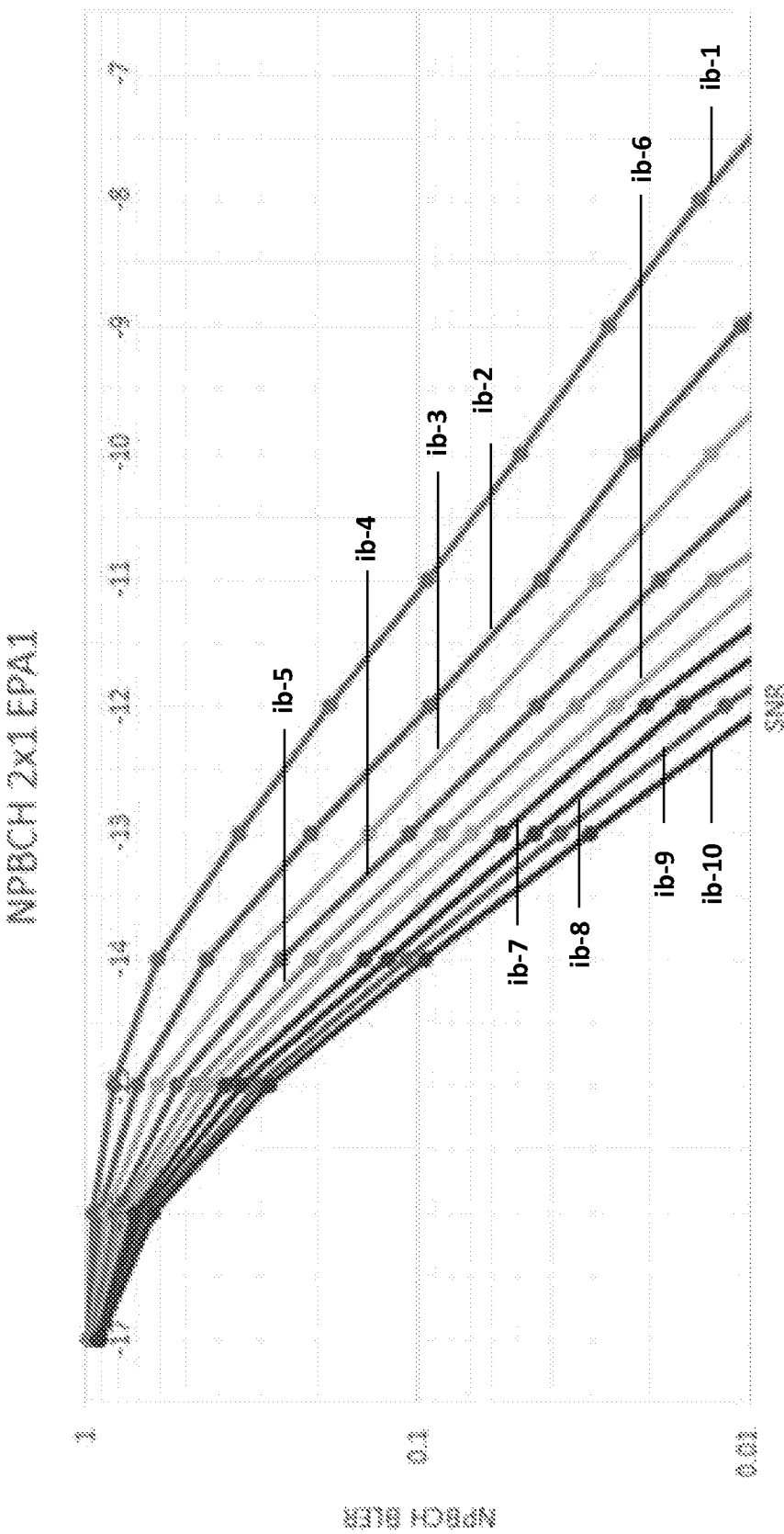
FIG. 3 shows simulation results of narrowband master information block (MIB-NB) acquisition probability vs. number of decoding attempts.

By using techniques such as power boosting and repetitions, the coverage for NB-IoT devices may be enhanced compared to the legacy LTE system. However, for wireless devices in low coverage areas, it may take some time to acquire the system information. If the UE cannot decode MIB-NB because of poor channel conditions, the UE continues to receive and decode NPBCH until MIB-NB acquisition is successful. FIG. 3 shows simulation results of MIB-NB acquisition probability (BLER) vs. number of decoding attempts. In the figure, "ib-n" represents NPBCH decoding rate evaluated over n TTI (n×640 ms). In the case of "ib-4," the UE attempts four independent decodes (4×640 ms=2.560 s). As FIG. 3 shows, SNR>−11 dB is necessary to achieve BLER≤0.1 (10% decoding failure or 90% decoding success) for 640-ms MIB-NB acquisition time. However, NB-IoT is intended to support UE operation in much worse channel conditions, e.g., SNR≥−15 dB. For example, if the UE is located at the area with SNR=−12 dB, MIB-NB acquisition time of at least 2×640 ms=1.28 s is required to achieve BLER≤0.1. And if the UE is located where SNR=−15 dB, it is expected to take more than 10 attempts to achieve BLER≤0.1.

These results indicate that the coding rate or repetition for NPBCH is insufficient for decoding MIB-NB in a single attempt in a low-SNR region, or in an enhanced coverage extension area. Requiring multiple MIB-NB decoding attempts is not suitable for IoT-type devices that are expected to utilize NB-IoT, because such devices often need to transmit/receive only a few bytes of data per day, which can require very little time (e.g., 100 ms to 1 s). Even two decode attempts require 1.28 s, which is longer than even the most pessimistic estimate of data transmission/reception time. Requiring the UE to activate its radio and baseband processor at least an additional 1.28 s in low-signal or enhanced coverage environments can significantly reduce device battery life. For example, this additional energy consumption can reduce a device's operation with two (2) AA batteries to much less ten (10) years, which is a common requirement for certain IoT use cases.

Exemplary embodiments of the present disclosure address these and other problems by a first network node, serving a UE in a first cell, obtaining information about one of the plurality of repetition methods used for transmitting a broadcast channel (e.g. MIB-NB in NPBCH) by a second network node serving a second cell. One or more of the repetition methods can include utilizing REs in PRB symbols 0-3 that are currently not used for NPBCH information. The first network node can obtain the repetition information based on pre-defined information, statistics or historical data, information received from another network node (e.g. the second network node), and information received from one or more further UEs. The first network node sends the obtained repetition information to the UE, which uses the received repetition information for acquiring the broadcast channel (e.g. MIB-NB in NPBCH) of the second cell, such as when performing cell change from the first cell to the second cell.

Providing a UE (e.g., NB-IoT device) with pre-acquisition awareness of the repetition method and with the ability to combine the repetitions facilitates and/or enables the UE to acquire the broadcast channel (e.g., NPBCH MIB-NB) in the second cell more quickly for a given SNR, thereby improving operational duration (e.g., battery life) by avoiding excessive energy use for broadcast channel acquisition. Alternately, the improvements facilitate and/or enable the UE to acquire the broadcast channel at a lower SNR for a given acquisition time (i.e., increased sensitivity).

Furthermore, a network node can choose a suitable NPBCH/MIB-NB repetition method according to the cell and/or UE coverage conditions, thereby providing more flexibly in NB-IoT deployment. Advantages also include better mobility within and between cells, which can be particularly useful for ultra-reliable, low-latency communications (URLLC), an important data-service use case for 5G networks.

Figure 4:
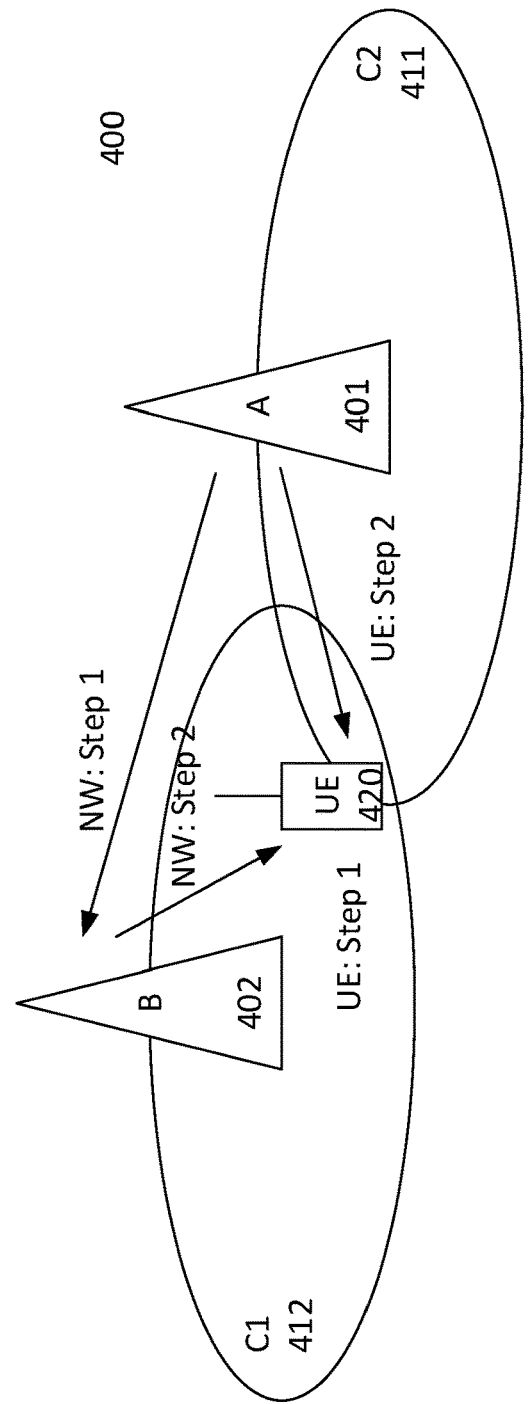
FIG. 4 shows an exemplary network arrangement of a user equipment (e.g., wireless device) and two network nodes serving respective cells, according to various exemplary embodiments of the present disclosure.

FIG. 4 shows an exemplary network arrangement (400) of a UE (420) and two network nodes A (401) and B (402) serving respective cells C2 (411) and C1 (412), which is used to illustrate various exemplary embodiments discussed herein. In various exemplary embodiments, network node A serving C2 broadcasts various information to UEs within reception range, including a broadcast channel (e.g., NPBCH) as discussed above. In addition, network node A utilizes one or more repetition methods for the information carried by NPBCH (e.g., MIB-NB). The one or more repetition methods or schemes used by node A can employ one or more normally-unused OFDM symbols (e.g., 3 symbols) in the broadcast channel (e.g. NPBCH) in order to assist the UE to decode the MIB-NB in shorter time.

Furthermore, network node B can obtain information related to the one or more repetition methods used by network node A. In some exemplary embodiments, network node A and network node B can be different while in other exemplary embodiments, they can be the same (e.g., same network node serves and/or manages C1 and C2). Network node B can obtain the information about one or more NPBCH repetition methods by one or more of the following mechanisms:

pre-defined information (e.g., information stored in network node B);
  receiving the information from another network node (e.g., network node A, a core network node, another radio network node, a UE that has previously received such information, etc.);
  statistical and/or historical data (e.g., recently used scheme in C2);
  internal communication within network node B (e.g., C1 and C2 are served by the same network node B).

Figure 2:
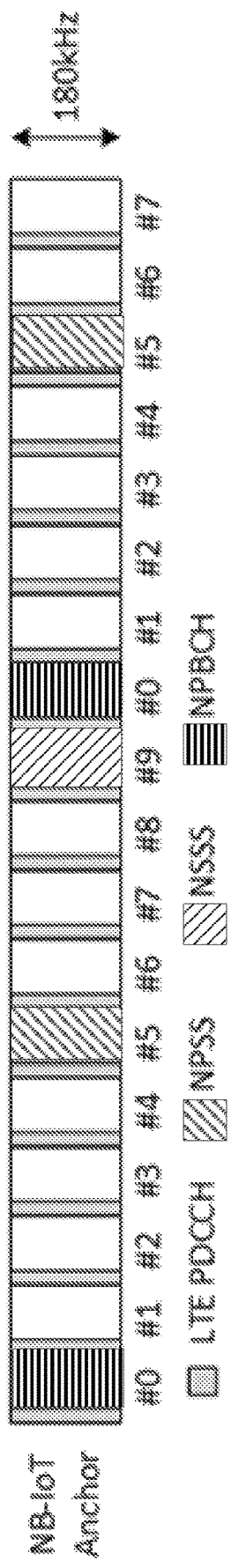
FIG. 2 shows an exemplary transmission timing of PBCH during a subframe.
Figure 5:
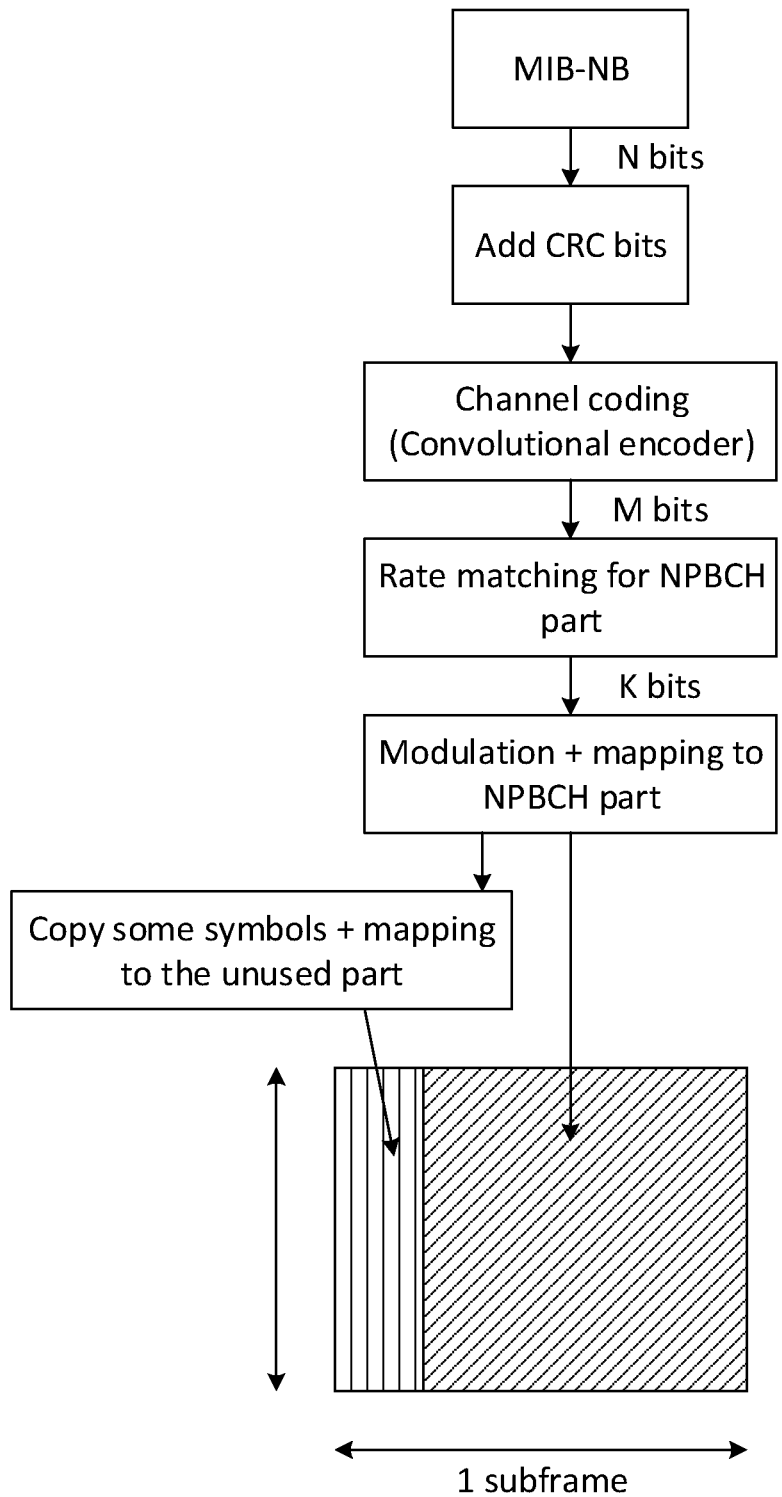
FIGS. 5-6 show exemplary combinations of coding, rate-matching, and repetition operations according to various exemplary embodiments of the present disclosure.

Various repetition methods or schemes for broadcast channel information (e.g., MIB-NB) are possible. In some exemplary embodiments, one or more of the existing information-bearing symbols in the NPBCH PRB (e.g., any of symbols 3-13 shown in FIG. 1) can be repeated in the portion of the NPBCH PRB that normally does not carry NPBCH information (e.g., symbols 0-2). For example, there are 28 REs in the first three OFDM symbols of the NPBCH PRB, that are ordinarily used for LTE PDCCH as shown in FIG. 1. Rather than transmitting PDCCH, however, network node A can repeat 28 NPBCH information-bearing symbols from OFDM symbols 3-13 (e.g., the first 28 in symbols 3-5) in the 28 REs of symbols 0-2 of the subframe containing NPBCH (i.e., subframe 0 shown in FIG. 2). FIG. 5 illustrates exemplary coding, rate-matching, and repetition operations corresponding to these exemplary embodiments.

Figure 6:
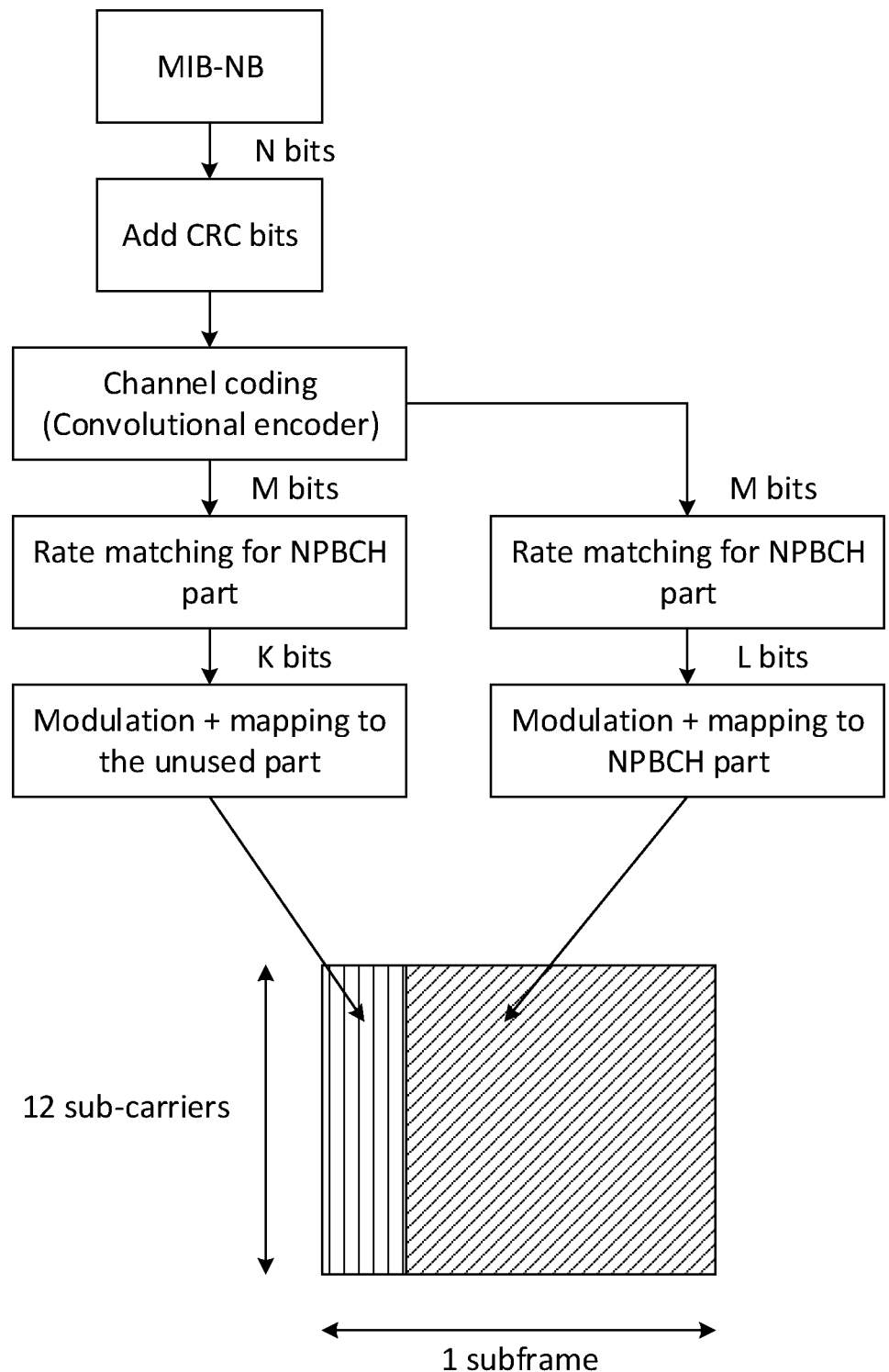

Alternatively, or in addition, the source bits of the MIB-NB can be encoded and then rate-matched differently for each repetition—one matched to the transmission in symbols 3-13 as customary, another matched for repetition in the normally unused portions of symbols 0-2. For example, the entire contents of MIB-NB can be encoded and transmitted in the first three OFDM symbols in subframe 0. As such, a much higher code rate is used for the repetition in the first three symbols. For example, after MIB-NB information is coded as customary for symbols 3-13, every third bit is picked up (e.g., punctured) with the symbol offset 1, and mapped to the normally unused portions of symbols 0-2 after modulation. The effective code rate and/or puncturing used for the repetition in symbols 0-2 can be pre-defined or configured by network node A. This exemplary embodiment can be particularly useful when C2 is expected to serve at least one UE operating in enhanced coverage. FIG. 6 illustrates exemplary coding, rate-matching, and repetition operations corresponding to these exemplary embodiments.

In exemplary embodiments of using NPBCH repetition schemes for NB-IoT in-band operation, network node A can schedule LTE PDCCH such that it does not utilize the REs that are used for repetition of NPBCH. For example, node A can forego transmission of PCFICH/PDCCH in subframe 0. It is also possible to keep the same transmission as in 3GPP Rel-13 NB-IoT, i.e. the network does not use symbols 0-2 in subframe 0. The network can choose this option, for example, when the cell radius is very small and/or when UE channel condition is good (e.g., high SNR). This can reduce the required transmission power and, accordingly, the energy consumption of the network node. Alternately, if the network node A operates in NB-IoT in-band mode and uses less than three symbols for LTE PDCCH transmission (e.g., 1 or 2 of symbols 0-2), the network node A can forego NPBCH transmission on these symbols but utilize the other symbols for NPBCH repetition.

In other exemplary embodiments, network node A can apply a particular repetition method corresponding to a coverage mode. For example, node A can apply the exemplary method shown in FIG. 5 in enhanced coverage, because it is expected to provide greater performance due to increased time/frequency diversity, albeit at the expense of greater receiver decoding complexity. Alternately, node A can apply the exemplary method shown in FIG. 5 in normal coverage, where the reduced complexity receiver provides sufficient performance with reduced energy consumption relative to the more complex decoding required for the method shown in FIG. 6.

After obtaining the information regarding the repetition method(s) used in network node A, network node B can send (e.g., signal) this information to the UE that is currently served by node B in C1. In other words, network node B signals towards the UE information regarding how neighboring network node A (and, alternately, other neighboring network nodes not shown in FIG. 4) utilizes the unused symbols in subframe containing the NPBCH. For example, if the network copies a part of NPBCH symbols (e.g., as illustrated by FIG. 5), then the network node can signal which part is repeated. Likewise, if the network uses different rate matching (e.g., as illustrated by FIG. 6), then the network can signal the rate matching method (e.g., puncturing and/or offset). If network does not apply any repetition, the network can signal this information also. Any compatible UEs that receive this signalling will treat the information in symbols 0-2 accordingly.

Network node B can signal the obtained information about the broadcast repetition method used in neighbor cells (also referred to herein as "assistance information") in various ways including: system information (e.g., in a SIB such as SIB1-NB) and UE specific message (e.g., dedicated channel using RRC signaling, PDCCH, etc.). Examples of UE specific messages are cell change command (e.g., RRC re-establishment, etc.), RRC reconfiguration message, etc. In some exemplary embodiments, the signaling of the repetition method can be based on UE coverage enhancement mode. For example, network node only signals this information for UEs in the enhanced coverage, but not for UEs in the normal coverage. In other exemplary embodiments, the network node can transmit the assistance information regardless of coverage mode. In this manner, even UEs that are in normal coverage can utilize the information to decode MIB-NB in shorter time and thereby increasing battery life.

In other exemplary embodiments, the signaling of the repetition method can be based on UE mobility behavior. For example, network node can only signal this information for mobile UEs (e.g., likely to do cell change into C2), but not for stationary (fixed) UEs that are unlikely to do any cell change to C2. In another example, network node can only signal this information for UEs whose speed is above certain speed threshold (e.g., UE Doppler frequency above 30 Hz and/or UE speed above 20 km/h).

In some exemplary embodiments, the various available repetition methods can be pre-defined in a specification or standard (e.g., 3GPP TS 36.213 and 36.331), and the network node simply signals an indicator referring to one of the predefined repetition methods. FIG. 7 shows an exemplary predefined repetition signalling scheme in tabular form, according to these exemplary embodiments. Upon receiving the information about the repetition method used in the cell (e.g., C2) whose broadcast channel is to be acquired, the UE can adapt its receiver resources and use the adapted receiver resources for receiving the broadcast channel of the cell (e.g., C2). Examples of receiver parameters are memory, processors, etc. For example, the amount of memory and processor resources required for storing and post processing the decoding of the broadcast channel can depend on particular repetition method. For example, the repetition technique shown in FIG. 6 can require larger amount of memory for post-processing compared with other methods, such as the technique shown in FIG. 5. This is because when decoding the repetition technique shown in FIG. 6, the entire broadcast channel contents in symbols 3-13 is combined with the replicated contents in symbols 0-2.

According to yet another aspect of this embodiment, the time required by the UE to acquire the broadcast channel of C2 can depend on the repetition method used in C2. For example, considering four options consisting of no repetition and different repetition techniques 1-3, the time required to acquire the broadcast channel can correspond to time periods of T0, T1, T2, and T3, respectively. The time periods T0, T1, T2 and T3 can be pre-defined, e.g., in terms of UE performance requirements in a specification and/or standard. The broadcast channel acquisition time period can comprise the time required by the UE to do cell change, e.g., from C1 to C2. As such, the delay during cell change (e.g., cell reselection, RRC re-establishment, etc.) can further depend on whether any repetition method is used for transmission of broadcast channel in C2 and, if so, the type of repetition method used. For example, the cell change can occur more quickly when any of the repetition method is used in the broadcast channel transmitted in C2. The values of broadcast channel acquisition time (e.g., T0-T3) can further depend on the UE coverage enhancement level with respect to C2. For example, given a particular repetition method, the broadcast channel acquisition time can be longer for enhanced coverage compared to the normal coverage.

In some exemplary embodiments, a pre-defined rule can facilitate and/or enable the UE to use a particular repetition method under one or more conditions. For example, the UE can be configured by the network node regarding the repetition method used by a particular cell for transmitting the broadcast information (e.g., NPBCH) according the exemplary signalling scheme illustrated in FIG. 7. Even so, the UE can also use the repetition method for enhancing the reception of the broadcast channel only when it determines that one or more conditions and/or scenarios associated with that method are met. Exemplary conditions and/or scenarios can include coverage enhancement level, speed, radio conditions, cell change condition, etc. The speed threshold can be pre-defined or can be signalled by the network node to the UE. Upon receiving information about the repetition method, the UE can determine whether or not to acquire the broadcast channel of the cell (e.g., C2) by using the indicated repetition method, based on the existence of the one or more pre-defined or signalled condition(s) (e.g., coverage enhancement level, speed, etc.). If such condition(s) are met, then the UE can receive the broadcast channel by applying the indicated repetition method. Otherwise, the UE can receive the broadcast channel by using the legacy/conventional method, e.g., by receiving NPBCH only in symbols 3-13. FIG. 8 illustrates exemplary conditions under which the UE can apply the various repetition methods signalled according the exemplary technique shown in FIG. 7.

In some exemplary embodiments, the UE can use the results related to decoding the broadcast channel of C2 according to the provided repetition method for performing one or more operations or tasks. Examples of such tasks include performing the cell change to C2 within certain time period (e.g., T1 and T2 when repetition method #1 and repetition method #2 respectively are used), transmitting the results or associated information to the network node (e.g., network node A and/or B), and using the results for internal tasks (e.g. positioning).

In some exemplary embodiments, network node B can also receive results of measurements performed on C2 by the UE after the UE decoded the MIB-NB based on the signaled information. Examples of received measurement results include cell global identifier (CGI) of a target cell (e.g., C2). The CGI is ordinarily included in system information block (SIB) #1 of C2. In order to acquire the CGI of C2 the UE first acquires the MIB-NB to obtain at least a system frame number (SFN) and scheduling information used for transmitting SIB1-NB in C2, and use them to acquire the CGI by reading SIB1-NB. Network node B can use this information, e.g., to resolve PCI confusion when multiple cells have the same PCI, or for building automatic neighbor relations (ANR).

Other exemplary embodiments include operations performed by a UE in cooperation and/or coordination with the operations performed by network nodes A and B, described above. In general terms, the UE operations can include: camping on (or being connected to) C1 served by network node B; receiving information signalled from network node B related to at least one repetition methods used in neighbor cell C2 served by network node A; decoding the MIB-NB of the NPBCH broadcast by network node A according to the received information related to the repetition method(s); and, optionally, performing measurements on C2 subsequent to decoding the MIB-NB. These operations are described in more detail below.

When the UE camps on or is connected to C1 serviced by network node B, the UE can repeatedly receive paging information from network node B. During the paging occasion, the UE can also perform the cell measurement and can receive messages from C1. In addition, the UE can receive information (e.g., "assistance information") about one or more repetition methods (e.g., NPBCH repetition methods) used in C2, which is managed by neighboring network node A. In some embodiments, both C1 and C2 can be served by the same network node, i.e., network node A=network node B. The UE can receive the assistance information in various ways including those corresponding to the exemplary ways, described above, that network node B can transmit the information.

Subsequently, after receiving the assistance information, the UE can decode the MIB-NB of the NPBCH broadcast by network node A (e.g., in C2) according to the repetition method(s) identified in the assistance information. For example, the UE can adapt and/or select the MIB decoding procedure from the following available procedures:

a first procedure (P1) is used for MIB decoding provided that received information indicates that NPBCH transmissions are repeated according to the method illustrated by FIG. 4. The UE can combine the repeated information in the symbols 0-2 (e.g., in the 28 available REs) with the corresponding information in some portion of symbols 3-13 of the legacy NPBCH.

a second procedure (P2) used for MIB decoding provided that the received information indicates that NPBCH transmissions are repeated according to the method illustrated by FIG. 5. The UE can combine the higher-code-rate information repeated in the symbols 0-2 (e.g., in the 28 available REs) with the corresponding lower-code-rate information in symbols 3-13 of the legacy NPBCH, using the appropriate rate matching during decoding.

a third procedure (P3) that assumes that NPBCH transmissions are not repeated absent any received assistance information identifying a particular repetition method.

One particular advantage of adapting and/or selecting the MIB decoding procedure according to received information is that it helps the UE to use the appropriate methods to decode and acquire the MIB. More specifically, if the UE knows that repetitions are provided according to a particular repetition method, then it can avoid using any rate matching schemes or any other more complex decoding schemes, and vice versa. This can result in reduced complexity in some scenarios, and can help the UE to acquire the MIB more quickly by applying an appropriate decoding method. Moreover, the UE ordinarily needs to acquire the C2 MIB in order to acquire system information in relation to one or more mobility procedures such as cell change, cell reselection, handover, RRC connection release with redirection, RRC connection reestablishment, etc. As such, improving the MIB decoding facilitates greater reliability and robustness in these and other exemplary mobility procedures.

Optionally, the UE can perform measurement on the cell whose MIB was acquired and/or decoded and report it to a network node, such as node B. Examples of measurements are Cell Global Identifier (CGI).

As mentioned above, the term "repetition" used herein can refer to transmitting at least two substantially signals, in relation to a physical channel, in different time resources (e.g., different subframes). Given examples of physical channels included, among others, both NPBCH and PBCH. As such, a skilled person will recognize that the above-described advantages of adapting and/or selecting the MIB decoding procedure according to received information can apply not only to adaptively decoding MIB-NB repetitions in NPBCH transmissions, but also also to adaptively decoding MIB repetitions in PBCH transmissions.

Figure 9:
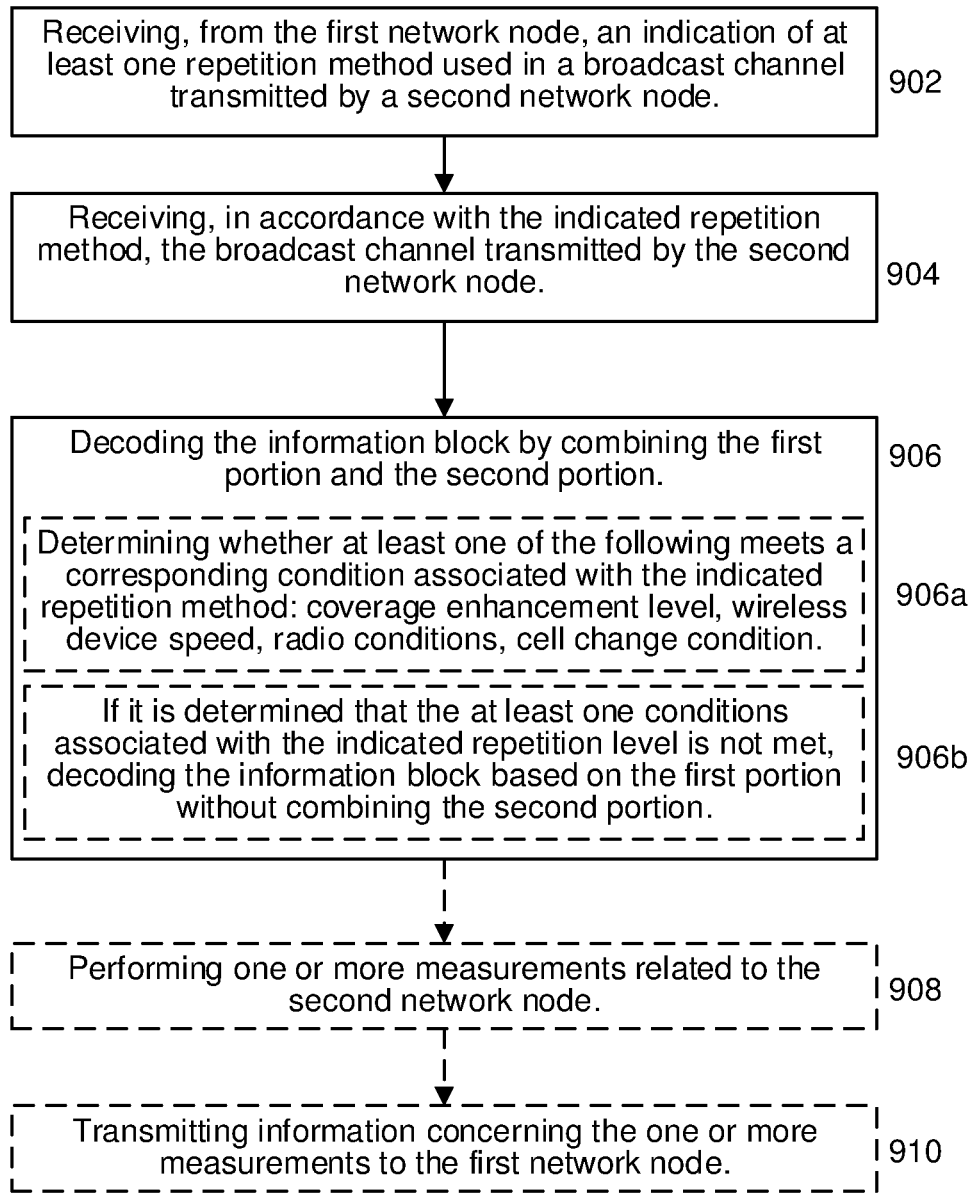
FIG. 9 is a flow diagram illustrating exemplary methods and/or procedures performed by a user equipment (UE, e.g., wireless device, NB-IoT device, MTC device, etc.), according to various exemplary embodiments of the present disclosure.
Figure 10:
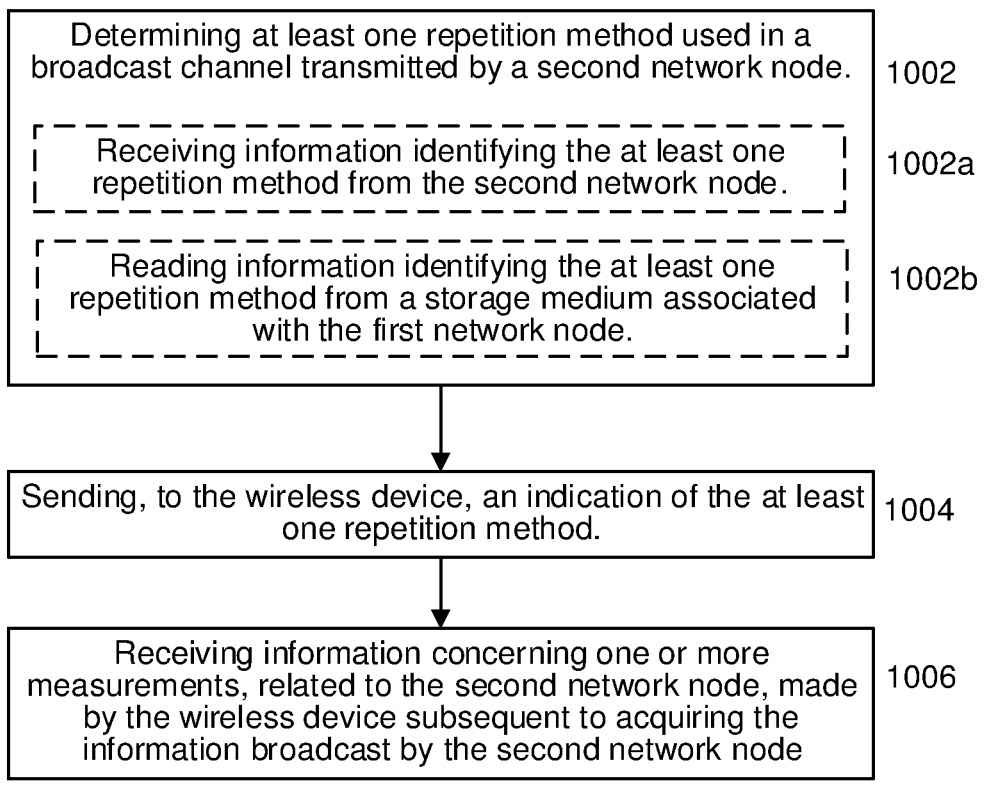
FIG. 10 is a flow diagram illustrating exemplary methods and/or procedures performed by a first network node (e.g., eNB, base station, etc.), according to various exemplary embodiments of the present disclosure.
Figure 11:
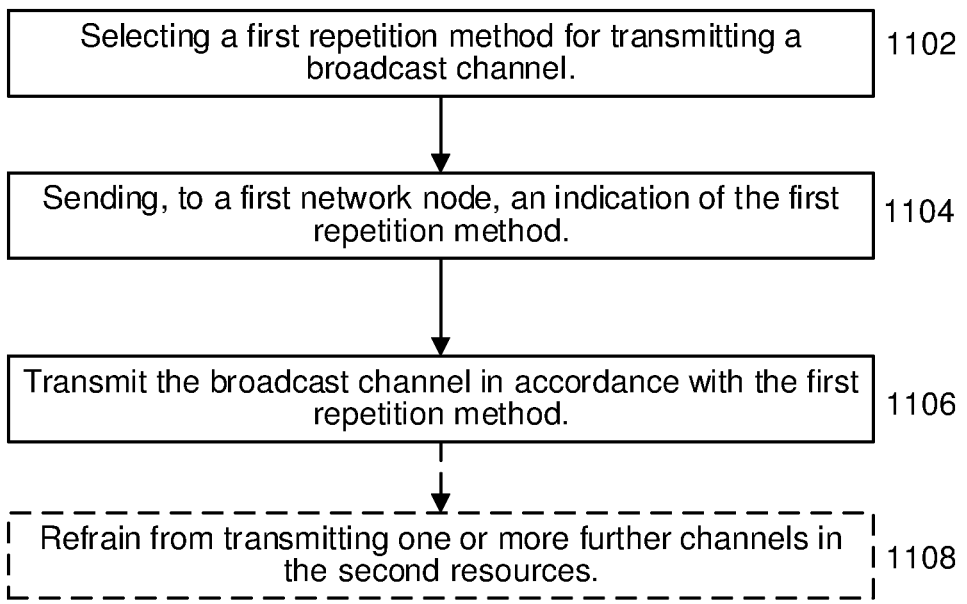
FIG. 11 is a flow diagram illustrating exemplary methods and/or procedures performed by a second network node (e.g., eNB, base station, etc.), according to various exemplary embodiments of the present disclosure.

FIG. 9 illustrates an exemplary method and/or procedure performed in a wireless device or user equipment (UE) in communication with a first network node, in accordance with particular exemplary embodiments of the present disclosure. Although the exemplary method and/or procedure is illustrated in FIG. 9 by blocks in a particular order, this order is exemplary and the operations corresponding to the blocks can be performed in different orders, and can be combined and/or divided into blocks having different functionality than shown in FIG. 9. Furthermore, the exemplary method and/or procedure shown in FIG. 9 can be complementary to exemplary method and/or procedure illustrated in FIGS. 10 and 11. In other words, exemplary methods and/or procedures shown in FIGS. 9-11 are capable of being used cooperatively to provide benefits, advantages, and/or solutions to problems described hereinabove. Optional blocks and/or operations are indicated by dashed lines.

The exemplary method and/or procedure can include block 902, where the wireless device can receive, from the first network node, an indication of at least one repetition method used in a broadcast channel transmitted by a second network node. In some exemplary embodiments, the repetition method can comprise a first portion of an information block in first resources of the broadcast channel that are reserved for the information block, and a second portion, comprising at least a subset of the first portion, in second resources of the broadcast channel that are different from the first resources. In some exemplary embodiments, the second resources are not reserved for the information block.

In some exemplary embodiments, the broadcast channel can be a physical broadcast channel (PBCH), the information block can be a master information block (MIB), the first resources can comprise at least a portion of symbols that include the PBCH, and the second resources can comprise at least a portion of symbols that do not include the PBCH. In other exemplary embodiments, the broadcast channel can be a narrowband physical broadcast channel (NPBCH), the information block can be a narrowband master information block (MIB-NB), the first resources can comprise at least a portion of symbols that include the NPBCH, and the second resources can comprise at least a portion of symbols that do not include the NPBCH. For example, the first resources can comprise at least a portion of symbols 3-13 of a physical resource block (PRB), and the second resources can comprise at least a portion of symbols 0-2 of the PRB.

In some exemplary embodiments, the first repetition method comprises repeating a subset of the first portion of the MIB-NB in the second resources. In some exemplary embodiments, the first repetition method comprises the first portion of the MIB-NB coded at a first rate, the second portion comprises the first portion of the MIB-NB coded at a second rate greater than the first rate, and repeating the first portion of the MIB-NB coded at the second rate in the second resources.

The exemplary method and/or procedure can also include block 904, where the wireless device can receive the broadcast channel transmitted by the second network node in accordance with the indicated repetition method. The exemplary method and/or procedure can also include block 906, where the wireless device can decode the information block by combining the first portion and the second portion. In some exemplary embodiments, the first portion and the second portion are rate-matched before combining.

In some embodiments, the operations of block 906 can also include the operations of sub-block 906a, where the wireless device can determine whether at least one of the following meets a corresponding condition associated with the indicated repetition method: coverage enhancement level, wireless device speed, radio conditions, and cell change condition. If it is determined in block 906a that the at least one condition associated with the indicated repetition level is/are not met, the operations of block 906 can also include the operations of sub-block 906b, where the wireless device can decode the information block based on the first portion without combining the second portion. Otherwise, if the at least one condition associated with the indicated repetition level is/are met, the wireless device can decode the information block by combining the first and second portions.

In some embodiments, the exemplary method and/or procedure shown in FIG. 9 can also include block 908, where the wireless device can perform one or more measurements related to the second network node (e.g., subsequent to decoding the information block), and block 910, where the wireless device can transmit information concerning the one or more measurements to the first network node.

FIG. 10 illustrates an exemplary method and/or procedure performed in a first network node (e.g., a base station) for assisting the wireless device to acquire information broadcast by a second network node, in accordance with particular exemplary embodiments of the present disclosure. Although the exemplary method and/or procedure is illustrated in FIG. 10 by blocks in a particular order, this order is exemplary and the operations corresponding to the blocks can be performed in different orders, and can be combined and/or divided into blocks having different functionality than shown in FIG. 10. Furthermore, the exemplary method and/or procedure shown in FIG. 10 can be complementary to exemplary methods and/or procedures illustrated in FIGS. 9 and 11. In other words, exemplary methods and/or procedures shown in FIGS. 9-11 are capable of being used cooperatively to provide benefits, advantages, and/or solutions to problems described hereinabove. Optional blocks and/or operations are indicated by dashed lines.

The exemplary method and/or procedure can include block 1002, where the first network node can determine at least one repetition method used in a broadcast channel transmitted by a second network node. In some exemplary embodiments, the first network node can receive the information from the second network node. In some exemplary embodiments, the repetition method can comprise a first portion of an information block in first resources of the broadcast channel that are reserved for the information block, and a second portion, comprising at least a subset of the first portion, in second resources of the broadcast channel that are different from the first resources. In some exemplary embodiments, the second resources are not reserved for the information block.

In some exemplary embodiments, the broadcast channel can be a physical broadcast channel (PBCH), the information block can be a master information block (MIB), the first resources can comprise at least a portion of symbols that include the PBCH, and the second resources can comprise at least a portion of symbols that do not include the PBCH. In other exemplary embodiments, the broadcast channel can be a narrowband physical broadcast channel (NPBCH), the information block can be a narrowband master information block (MIB-NB), the first resources can comprise at least a portion of symbols that include the NPBCH, and the second resources can comprise at least a portion of symbols that do not include the NPBCH. For example, the first resources can comprise at least a portion of symbols 3-13 of a physical resource block (PRB), and the second resources can comprise at least a portion of symbols 0-2 of the PRB.

In some exemplary embodiments, the first repetition method comprises repeating a subset of the first portion of the MIB-NB in the second resources. In some exemplary embodiments, the first repetition method comprises the first portion of the MIB-NB coded at a first rate, the second portion comprises the first portion of the MIB-NB coded at a second rate greater than the first rate, and repeating the first portion of the MIB-NB coded at the second rate in the second resources.

In some embodiments, the operations of block 1002 can include the operations of sub-block 1002*a*, where the first network node can receive information identifying the at least one repetition method from the second network node. In some embodiments, the operations of block 1002 can include the operations of sub-block 1002*b*, where the first network node can read information identifying the at least one repetition method from a storage medium associated with the first network node.

The exemplary method and/or procedure can also include block 1004, where the first network node can send, to the wireless device, an indication of the at least one repetition method. In some exemplary embodiments, the indication can comprise a multi-bit field that indicates one of a plurality of available repetition methods. In some exemplary embodiments, sending the indication of the at least one repetition method can be based on enhanced coverage with respect to the wireless device. In some exemplary embodiments, sending the indication of the at least one repetition method can be based on an expected mobility for the wireless device.

The exemplary method and/or procedure can also include block 1006, where the first network node can receive information concerning one or more measurements, related to the second network node, made by the wireless device subsequent to acquiring the information broadcast by the second network node.

FIG. 11 illustrates an exemplary method and/or procedure performed in a second network node (e.g., a base station) for transmitting a broadcast channel, in accordance with exemplary embodiments of the present disclosure. Although the exemplary method and/or procedure is illustrated in FIG. 11 by blocks in a particular order, this order is exemplary and the operations corresponding to the blocks can be performed in different orders, and can be combined and/or divided into blocks having different functionality than shown in FIG. 11. Furthermore, the exemplary method and/or procedure shown in FIG. 11 can be complementary to exemplary methods and/or procedures illustrated in FIGS. 9-10. In other words, exemplary methods and/or procedures shown in FIGS. 9-11 are capable of being used cooperatively to provide benefits, advantages, and/or solutions to problems described hereinabove. Optional blocks and/or operations are indicated by dashed lines.

The exemplary method and/or procedure can include block 1102 where the second network node can select a first repetition method for transmitting a broadcast channel. The repetition method can comprise a first portion of an information block in first resources of the broadcast channel that are reserved for the information block, and a second portion, comprising at least a subset of the first portion, in second resources of the broadcast channel that are different from the first resources. In some exemplary embodiments, the second resources are not reserved for the information block. In some exemplary embodiments, selecting the first repetition method can be based on enhanced coverage with respect to the wireless device, e.g., a more robust repetition method can be selected for greater enhanced coverage.

In some exemplary embodiments, the broadcast channel can be a physical broadcast channel (PBCH), the information block can be a master information block (MIB), the first resources can comprise at least a portion of symbols that include the PBCH, and the second resources can comprise at least a portion of symbols that do not include the PBCH. In other exemplary embodiments, the broadcast channel can be a narrowband physical broadcast channel (NPBCH), the information block can be a narrowband master information block (MIB-NB), the first resources can comprise at least a portion of symbols that include the NPBCH, and the second resources can comprise at least a portion of symbols that do not include the NPBCH. For example, the first resources can comprise at least a portion of symbols 3-13 of a physical resource block (PRB), and the second resources can comprise at least a portion of symbols 0-2 of the PRB.

In some exemplary embodiments, the first repetition method can comprise repeating a subset of the first portion of the MIB-NB in the second resources. In some exemplary embodiments, the first repetition method can comprise the first portion of the MIB-NB coded at a first rate, the second portion can comprise the first portion of the MIB-NB coded at a second rate greater than the first rate, and repeating the first portion of the MIB-NB coded at the second rate in the second resources.

The exemplary method and/or procedure can also include block 1104, where the second network node can send, to a first network node, an indication of the first repetition method. In some exemplary embodiments, the indication comprises a multi-bit field that indicates one of a plurality of available repetition methods.

The exemplary method and/or procedure can also include block 1106, where the second network node can transmit the broadcast channel in accordance with the first repetition method. In some embodiments, the exemplary method and/or or procedure can also include block 1108, where the second network node can refrain from transmitting one or more further channels in the second resources. For example, the second network node can refrain from transmitting LTE PDCCH that would otherwise utilize the second resources.

Figure 12:
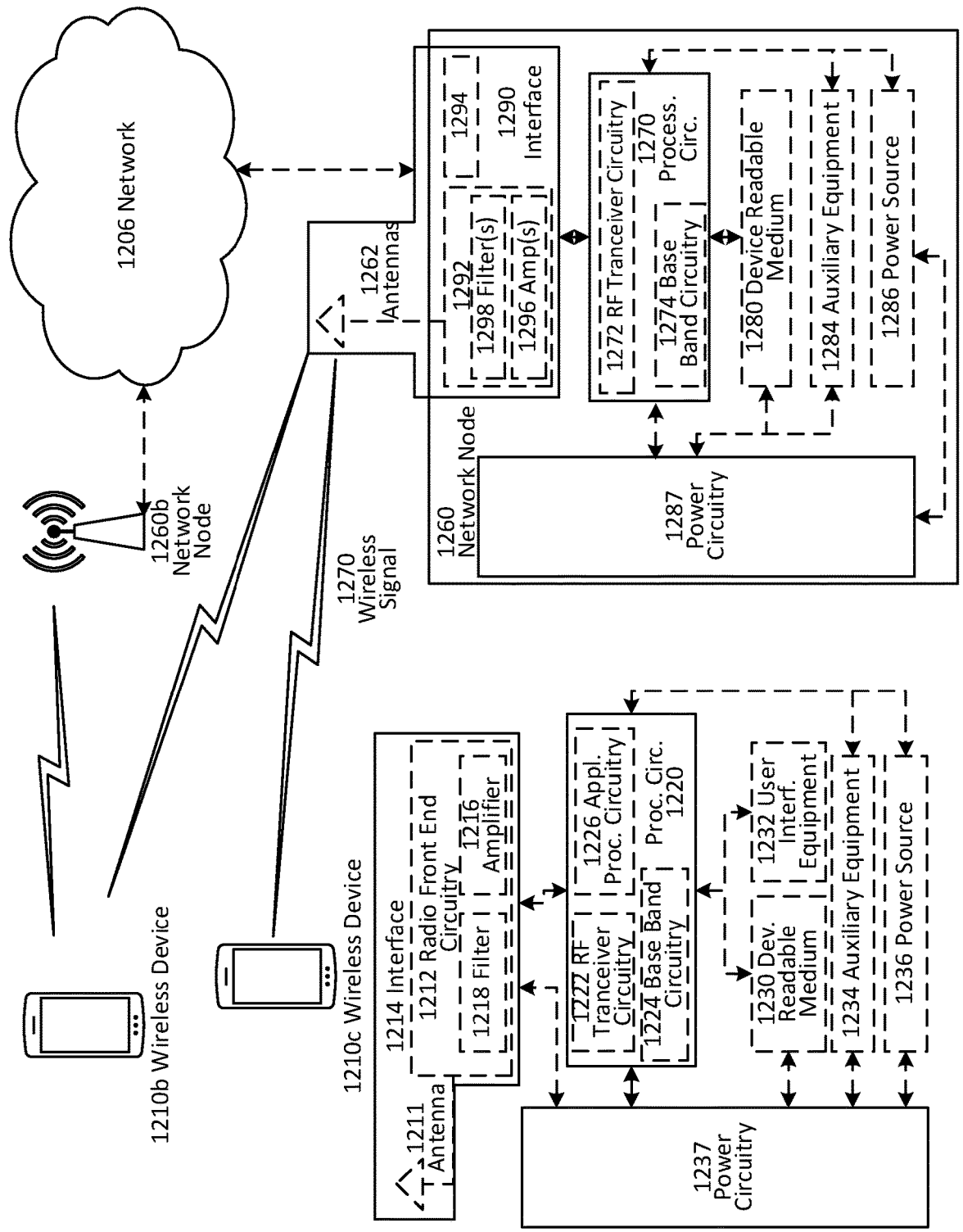
FIG. 12 is a block diagram of an exemplary wireless network configurable according to various exemplary embodiments of the present disclosure.

Although the subject matter described herein can be implemented in any appropriate type of system using any suitable components, the embodiments disclosed herein are described in relation to a wireless network, such as the example wireless network illustrated in FIG. 12. For simplicity, the wireless network of FIG. 12 only depicts network 1206, network nodes 1260 and 1260*b*, and WDs 1210, 1210*b*, and 1210*c*. In practice, a wireless network can further include any additional elements suitable to support communication between wireless devices or between a wireless device and another communication device, such as a landline telephone, a service provider, or any other network node or end device. Of the illustrated components, network node 1260 and wireless device (WD) 1210 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some exemplary embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1206 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1260 and WD 1210 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 12, network node 1260 includes processing circuitry 1270, device readable medium 1280, interface 1290, auxiliary equipment 1284, power source 1286, power circuitry 1287, and antenna 1262. Although network node 1260 illustrated in the example wireless network of FIG. 12 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1260 are depicted as single boxes located within a larger box, or nested within multiple boxes, in practice, a network node can comprise multiple different physical components that make up a single illustrated component (e.g., device readable medium 1280 can comprise multiple separate hard drives as well as multiple RAM modules).

Similarly, network node 1260 can be composed of multiple physically separate components (e.g., a NodeB component and a RNC component, or a BTS component and a BSC component, etc.), which can each have their own respective components. In certain scenarios in which network node 1260 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some exemplary embodiments, network node 1260 can be configured to support multiple radio access technologies (RATs). In such embodiments, some components can be duplicated (e.g., separate device readable medium 1280 for the different RATs) and some components can be reused (e.g., the same antenna 1262 can be shared by the RATs). Network node 1260 can also include multiple sets of the various illustrated components for different wireless technologies integrated into network node 1260, such as, for example, GSM, WCDMA, LTE, NR, WiFi, or Bluetooth wireless technologies. These wireless technologies can be integrated into the same or different chip or set of chips and other components within network node 1260.

Processing circuitry 1270 can be configured to perform any determining, calculating, or similar operations (e.g., certain obtaining operations) described herein as being provided by a network node. These operations performed by processing circuitry 1270 can include processing information obtained by processing circuitry 1270 by, for example, converting the obtained information into other information, comparing the obtained information or converted information to information stored in the network node, and/or performing one or more operations based on the obtained information or converted information, and as a result of said processing making a determination.

Processing circuitry 1270 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1260 components, such as device readable medium 1280, network node 1260 functionality. For example, processing circuitry 1270 can execute instructions stored in device readable medium 1280 or in memory within processing circuitry 1270. Such functionality can include providing any of the various wireless features, functions, or benefits discussed herein. In some exemplary embodiments, processing circuitry 1270 can include a system on a chip (SOC).

In some exemplary embodiments, processing circuitry 1270 can include one or more of radio frequency (RF) transceiver circuitry 1272 and baseband processing circuitry 1274. In some exemplary embodiments, radio frequency (RF) transceiver circuitry 1272 and baseband processing circuitry 1274 can be on separate chips (or sets of chips), boards, or units, such as radio units and digital units. In alternative embodiments, part or all of RF transceiver circuitry 1272 and baseband processing circuitry 1274 can be on the same chip or set of chips, boards, or units In certain embodiments, some or all of the functionality described herein as being provided by a network node, base station, eNB or other such network device can be performed by processing circuitry 1270 executing instructions stored on device readable medium 1280 or memory within processing circuitry 1270. In alternative embodiments, some or all of the functionality can be provided by processing circuitry 1270 without executing instructions stored on a separate or discrete device readable medium, such as in a hard-wired manner. In any of those embodiments, whether executing instructions stored on a device readable storage medium or not, processing circuitry 1270 can be configured to perform the described functionality. The benefits provided by such functionality are not limited to processing circuitry 1270 alone or to other components of network node 1260, but are enjoyed by network node 1260 as a whole, and/or by end users and the wireless network generally.

Device readable medium 1280 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1270. Device readable medium 1280 can store any suitable instructions, data or information, including a computer program, software, an application including one or more of logic, rules, code, tables, etc. and/or other instructions capable of being executed by processing circuitry 1270 and, utilized by network node 1260. Device readable medium 1280 can be used to store any calculations made by processing circuitry 1270 and/or any data received via interface 1290. In some exemplary embodiments, processing circuitry 1270 and device readable medium 1280 can be considered to be integrated.

Interface 1290 is used in the wired or wireless communication of signalling and/or data between network node 1260, network 1206, and/or WDs 1210. As illustrated, interface 1290 comprises port(s)/terminal(s) 1294 to send and receive data, for example to and from network 1206 over a wired connection. Interface 1290 also includes radio front end circuitry 1292 that can be coupled to, or in certain embodiments a part of, antenna 1262. Radio front end circuitry 1292 comprises filters 1298 and amplifiers 1296. Radio front end circuitry 1292 can be connected to antenna 1262 and processing circuitry 1270. Radio front end circuitry can be configured to condition signals communicated between antenna 1262 and processing circuitry 1270. Radio front end circuitry 1292 can receive digital data that is to be sent out to other network nodes or WDs via a wireless connection. Radio front end circuitry 1292 can convert the digital data into a radio signal having the appropriate channel and bandwidth parameters using a combination of filters 1298 and/or amplifiers 1296. The radio signal can then be transmitted via antenna 1262. Similarly, when receiving data, antenna 1262 can collect radio signals which are then converted into digital data by radio front end circuitry 1292. The digital data can be passed to processing circuitry 1270. In other embodiments, the interface can comprise different components and/or different combinations of components.

In certain alternative embodiments, network node 1260 may not include separate radio front end circuitry 1292, instead, processing circuitry 1270 can comprise radio front end circuitry and can be connected to antenna 1262 without separate radio front end circuitry 1292. Similarly, in some exemplary embodiments, all or some of RF transceiver circuitry 1272 can be considered a part of interface 1290. In still other embodiments, interface 1290 can include one or more ports or terminals 1294, radio front end circuitry 1292, and RF transceiver circuitry 1272, as part of a radio unit (not shown), and interface 1290 can communicate with baseband processing circuitry 1274, which is part of a digital unit (not shown).

Antenna 1262 can include one or more antennas, or antenna arrays, configured to send and/or receive wireless signals. Antenna 1262 can be coupled to radio front end circuitry 1290 and can be any type of antenna capable of transmitting and receiving data and/or signals wirelessly. In some exemplary embodiments, antenna 1262 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1262 can be separate from network node 1260 and can be connectable to network node 1260 through an interface or port.

Antenna 1262, interface 1290, and/or processing circuitry 1270 can be configured to perform any receiving operations and/or certain obtaining operations described herein as being performed by a network node. Any information, data and/or signals can be received from a wireless device, another network node and/or any other network equipment. Similarly, antenna 1262, interface 1290, and/or processing circuitry 1270 can be configured to perform any transmitting operations described herein as being performed by a network node. Any information, data and/or signals can be transmitted to a wireless device, another network node and/or any other network equipment.

Power circuitry 1287 can comprise, or be coupled to, power management circuitry and can be configured to supply the components of network node 1260 with power for performing the functionality described herein. Power circuitry 1287 can receive power from power source 1286. Power source 1286 and/or power circuitry 1287 can be configured to provide power to the various components of network node 1260 in a form suitable for the respective components (e.g., at a voltage and current level needed for each respective component). Power source 1286 can either be included in, or external to, power circuitry 1287 and/or network node 1260. For example, network node 1260 can be connectable to an external power source (e.g., an electricity outlet) via an input circuitry or interface such as an electrical cable, whereby the external power source supplies power to power circuitry 1287. As a further example, power source 1286 can comprise a source of power in the form of a battery or battery pack which is connected to, or integrated in, power circuitry 1287. The battery can provide backup power should the external power source fail. Other types of power sources, such as photovoltaic devices, can also be used.

Alternative embodiments of network node 1260 can include additional components beyond those shown in FIG. 12 that can be responsible for providing certain aspects of the network node's functionality, including any of the functionality described herein and/or any functionality necessary to support the subject matter described herein. For example, network node 1260 can include user interface equipment to allow and/or facilitate input of information into network node 1260 and to allow and/or facilitate output of information from network node 1260. This can allow and/or facilitate a user to perform diagnostic, maintenance, repair, and other administrative functions for network node 1260.

As used herein, wireless device (WD) refers to a device capable, configured, arranged and/or operable to communicate wirelessly with network nodes and/or other wireless devices. Unless otherwise noted, the term WD can be used interchangeably herein with user equipment (UE). Communicating wirelessly can involve transmitting and/or receiving wireless signals using electromagnetic waves, radio waves, infrared waves, and/or other types of signals suitable for conveying information through air. In some exemplary embodiments, a WD can be configured to transmit and/or receive information without direct human interaction. For instance, a WD can be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1210 includes antenna 1211, interface 1214, processing circuitry 1220, device readable medium 1230, user interface equipment 1232, auxiliary equipment 1234, power source 1236 and power circuitry 1237. WD 1210 can include multiple sets of one or more of the illustrated components for different wireless technologies supported by WD 1210, such as, for example, GSM, WCDMA, LTE, NR, WiFi, WiMAX, or Bluetooth wireless technologies, just to mention a few. These wireless technologies can be integrated into the same or different chips or set of chips as other components within WD 1210.

Antenna 1211 can include one or more antennas or antenna arrays, configured to send and/or receive wireless signals, and is connected to interface 1214. In certain alternative embodiments, antenna 1211 can be separate from WD 1210 and be connectable to WD 1210 through an interface or port. Antenna 1211, interface 1214, and/or processing circuitry 1220 can be configured to perform any receiving or transmitting operations described herein as being performed by a WD. Any information, data and/or signals can be received from a network node and/or another WD. In some exemplary embodiments, radio front end circuitry and/or antenna 1211 can be considered an interface.

As illustrated, interface 1214 comprises radio front end circuitry 1212 and antenna 1211. Radio front end circuitry 1212 comprise one or more filters 1218 and amplifiers 1216. Radio front end circuitry 1214 is connected to antenna 1211 and processing circuitry 1220, and can be configured to condition signals communicated between antenna 1211 and processing circuitry 1220. Radio front end circuitry 1212 can be coupled to or a part of antenna 1211. In some exemplary embodiments, WD 1210 may not include separate radio front end circuitry 1212; rather, processing circuitry 1220 can comprise radio front end circuitry and can be connected to antenna 1211. Similarly, in some exemplary embodiments, some or all of RF transceiver circuitry 1222 can be considered a part of interface 1214. Radio front end circuitry 1212 can receive digital data that is to be sent out to other network nodes or WDs via a wireless connection. Radio front end circuitry 1212 can convert the digital data into a radio signal having the appropriate channel and bandwidth parameters using a combination of filters 1218 and/or amplifiers 1216. The radio signal can then be transmitted via antenna 1211. Similarly, when receiving data, antenna 1211 can collect radio signals which are then converted into digital data by radio front end circuitry 1212. The digital data can be passed to processing circuitry 1220. In other embodiments, the interface can comprise different components and/or different combinations of components.

Processing circuitry 1220 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1210 components, such as device readable medium 1230, WD 1210 functionality. Such functionality can include providing any of the various wireless features or benefits discussed herein. For example, processing circuitry 1220 can execute instructions stored in device readable medium 1230 or in memory within processing circuitry 1220 to provide the functionality disclosed herein.

As illustrated, processing circuitry 1220 includes one or more of RF transceiver circuitry 1222, baseband processing circuitry 1224, and application processing circuitry 1226. In other embodiments, the processing circuitry can comprise different components and/or different combinations of components. In certain embodiments processing circuitry 1220 of WD 1210 can comprise a SOC. In some exemplary embodiments, RF transceiver circuitry 1222, baseband processing circuitry 1224, and application processing circuitry 1226 can be on separate chips or sets of chips. In alternative embodiments, part or all of baseband processing circuitry 1224 and application processing circuitry 1226 can be combined into one chip or set of chips, and RF transceiver circuitry 1222 can be on a separate chip or set of chips. In still alternative embodiments, part or all of RF transceiver circuitry 1222 and baseband processing circuitry 1224 can be on the same chip or set of chips, and application processing circuitry 1226 can be on a separate chip or set of chips. In yet other alternative embodiments, part or all of RF transceiver circuitry 1222, baseband processing circuitry 1224, and application processing circuitry 1226 can be combined in the same chip or set of chips. In some exemplary embodiments, RF transceiver circuitry 1222 can be a part of interface 1214. RF transceiver circuitry 1222 can condition RF signals for processing circuitry 1220.

In certain embodiments, some or all of the functionality described herein as being performed by a WD can be provided by processing circuitry 1220 executing instructions stored on device readable medium 1230, which in certain embodiments can be a computer-readable storage medium. In alternative embodiments, some or all of the functionality can be provided by processing circuitry 1220 without executing instructions stored on a separate or discrete device readable storage medium, such as in a hard-wired manner. In any of those particular embodiments, whether executing instructions stored on a device readable storage medium or not, processing circuitry 1220 can be configured to perform the described functionality. The benefits provided by such functionality are not limited to processing circuitry 1220 alone or to other components of WD 1210, but are enjoyed by WD 1210 as a whole, and/or by end users and the wireless network generally.

Processing circuitry 1220 can be configured to perform any determining, calculating, or similar operations (e.g., certain obtaining operations) described herein as being performed by a WD. These operations, as performed by processing circuitry 1220, can include processing information obtained by processing circuitry 1220 by, for example, converting the obtained information into other information, comparing the obtained information or converted information to information stored by WD 1210, and/or performing one or more operations based on the obtained information or converted information, and as a result of said processing making a determination.

Device readable medium 1230 can be operable to store a computer program, software, an application including one or more of logic, rules, code, tables, etc. and/or other instructions capable of being executed by processing circuitry 1220. Device readable medium 1230 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1220. In some exemplary embodiments, processing circuitry 1220 and device readable medium 1230 can be considered to be integrated.

User interface equipment 1232 can include components that allow and/or facilitate a human user to interact with WD 1210. Such interaction can be of many forms, such as visual, audial, tactile, etc. User interface equipment 1232 can be operable to produce output to the user and to allow and/or facilitate the user to provide input to WD 1210. The type of interaction can vary depending on the type of user interface equipment 1232 installed in WD 1210. For example, if WD 1210 is a smart phone, the interaction can be via a touch screen; if WD 1210 is a smart meter, the interaction can be through a screen that provides usage (e.g., the number of gallons used) or a speaker that provides an audible alert (e.g., if smoke is detected). User interface equipment 1232 can include input interfaces, devices and circuits, and output interfaces, devices and circuits. User interface equipment 1232 can be configured to allow and/or facilitate input of information into WD 1210, and is connected to processing circuitry 1220 to allow and/or facilitate processing circuitry 1220 to process the input information. User interface equipment 1232 can include, for example, a microphone, a proximity or other sensor, keys/buttons, a touch display, one or more cameras, a USB port, or other input circuitry. User interface equipment 1232 is also configured to allow and/or facilitate output of information from WD 1210, and to allow and/or facilitate processing circuitry 1220 to output information from WD 1210. User interface equipment 1232 can include, for example, a speaker, a display, vibrating circuitry, a USB port, a headphone interface, or other output circuitry. Using one or more input and output interfaces, devices, and circuits, of user interface equipment 1232, WD 1210 can communicate with end users and/or the wireless network, and allow and/or facilitate them to benefit from the functionality described herein.

Auxiliary equipment 1234 is operable to provide more specific functionality which may not be generally performed by WDs. This can comprise specialized sensors for doing measurements for various purposes, interfaces for additional types of communication such as wired communications etc. The inclusion and type of components of auxiliary equipment 1234 can vary depending on the embodiment and/or scenario.

Power source 1236 can, in some exemplary embodiments, be in the form of a battery or battery pack. Other types of power sources, such as an external power source (e.g., an electricity outlet), photovoltaic devices or power cells, can also be used. WD 1210 can further comprise power circuitry 1237 for delivering power from power source 1236 to the various parts of WD 1210 which need power from power source 1236 to carry out any functionality described or indicated herein. Power circuitry 1237 can in certain embodiments comprise power management circuitry. Power circuitry 1237 can additionally or alternatively be operable to receive power from an external power source; in which case WD 1210 can be connectable to the external power source (such as an electricity outlet) via input circuitry or an interface such as an electrical power cable. Power circuitry 1237 can also in certain embodiments be operable to deliver power from an external power source to power source 1236. This can be, for example, for the charging of power source 1236. Power circuitry 1237 can perform any converting or other modification to the power from power source 1236 to make it suitable for supply to the respective components of WD 1210.

Figure 13:
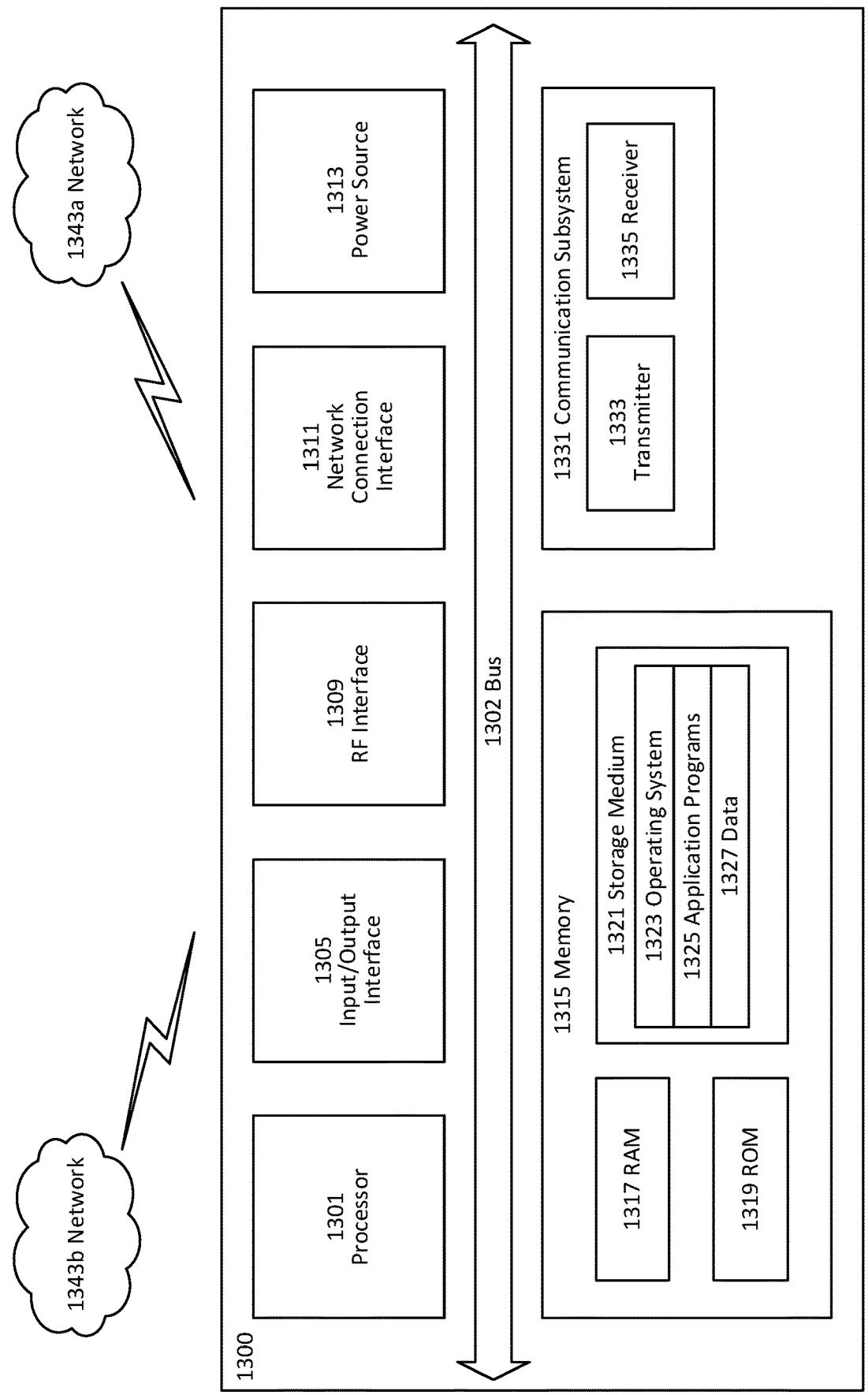
FIG. 13 is a block diagram of an exemplary user equipment (UE) configurable according to various exemplary embodiments of the present disclosure.

FIG. 13 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 13200 can be any UE identified by the 3$^{rd}$ Generation Partnership Project (3GPP), including a NB-IoT UE, a machine type communication (MTC) UE, and/or an enhanced MTC (eMTC) UE. UE 1300, as illustrated in FIG. 13, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 13 is a UE, the components discussed herein are equally applicable to a WD, and vice-versa.

In FIG. 13, UE 1300 includes processing circuitry 1301 that is operatively coupled to input/output interface 1305, radio frequency (RF) interface 1309, network connection interface 1311, memory 1315 including random access memory (RAM) 1317, read-only memory (ROM) 1319, and storage medium 1321 or the like, communication subsystem 1331, power source 1333, and/or any other component, or any combination thereof. Storage medium 1321 includes operating system 1323, application program 1325, and data 1327. In other embodiments, storage medium 1321 can include other similar types of information. Certain UEs can utilize all of the components shown in FIG. 13, or only a subset of the components. The level of integration between the components can vary from one UE to another UE. Further, certain UEs can contain multiple instances of a component, such as multiple processors, memories, transceivers, transmitters, receivers, etc.

In FIG. 13, processing circuitry 1301 can be configured to process computer instructions and data. Processing circuitry 1301 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1301 can include two central processing units (CPUs). Data can be information in a form suitable for use by a computer.

In the depicted embodiment, input/output interface 1305 can be configured to provide a communication interface to an input device, output device, or input and output device. UE 1300 can be configured to use an output device via input/output interface 1305. An output device can use the same type of interface port as an input device. For example, a USB port can be used to provide input to and output from UE 1300. The output device can be a speaker, a sound card, a video card, a display, a monitor, a printer, an actuator, an emitter, a smartcard, another output device, or any combination thereof. UE 1300 can be configured to use an input device via input/output interface 1305 to allow and/or facilitate a user to capture information into UE 1300. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 13, RF interface 1309 can be configured to provide a communication interface to RF components such as a transmitter, a receiver, and an antenna. Network connection interface 1311 can be configured to provide a communication interface to network 1343a. Network 1343a can encompass wired and/or wireless networks such as a local-area network (LAN), a wide-area network (WAN), a computer network, a wireless network, a telecommunications network, another like network or any combination thereof. For example, network 1343a can comprise a Wi-Fi network. Network connection interface 1311 can be configured to include a receiver and a transmitter interface used to communicate with one or more other devices over a communication network according to one or more communication protocols, such as Ethernet, TCP/IP, SONET, ATM, or the like. Network connection interface 1311 can implement receiver and transmitter functionality appropriate to the communication network links (e.g., optical, electrical, and the like). The transmitter and receiver functions can share circuit components, software or firmware, or alternatively can be implemented separately.

RAM 1317 can be configured to interface via bus 1302 to processing circuitry 1301 to provide storage or caching of data or computer instructions during the execution of software programs such as the operating system, application programs, and device drivers. ROM 1319 can be configured to provide computer instructions or data to processing circuitry 1301. For example, ROM 1319 can be configured to store invariant low-level system code or data for basic system functions such as basic input and output (I/O), startup, or reception of keystrokes from a keyboard that are stored in a non-volatile memory. Storage medium 1321 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1321 can be configured to include operating system 1323, application program 1325 such as a web browser application, a widget or gadget engine or another application, and data file 1327. Storage medium 1321 can store, for use by UE 1300, any of a variety of various operating systems or combinations of operating systems.

Storage medium 1321 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1321 can allow and/or facilitate UE 1300 to access computer-executable instructions, application programs or the like, stored on transitory or non-transitory memory media, to off-load data, or to upload data. An article of manufacture, such as one utilizing a communication system can be tangibly embodied in storage medium 1321, which can comprise a device readable medium.

In FIG. 13, processing circuitry 1301 can be configured to communicate with network 1343b using communication subsystem 1331. Network 1343a and network 1343b can be the same network or networks or different network or networks. Communication subsystem 1331 can be configured to include one or more transceivers used to communicate with network 1343*b*. For example, communication subsystem 1331 can be configured to include one or more transceivers used to communicate with one or more remote transceivers of another device capable of wireless communication such as another WD, UE, or base station of a radio access network (RAN) according to one or more communication protocols, such as IEEE 802.13, CDMA, WCDMA, GSM, LTE, UTRAN, WiMax, or the like. Each transceiver can include transmitter 1333 and/or receiver 1335 to implement transmitter or receiver functionality, respectively, appropriate to the RAN links (e.g., frequency allocations and the like). Further, transmitter 1333 and receiver 1335 of each transceiver can share circuit components, software or firmware, or alternatively can be implemented separately.

In the illustrated embodiment, the communication functions of communication subsystem 1331 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1331 can include cellular communication, Wi-Fi communication, Bluetooth communication, and GPS communication. Network 1343*b* can encompass wired and/or wireless networks such as a local-area network (LAN), a wide-area network (WAN), a computer network, a wireless network, a telecommunications network, another like network or any combination thereof. For example, network 1343*b* can be a cellular network, a Wi-Fi network, and/or a near-field network. Power source 1313 can be configured to provide alternating current (AC) or direct current (DC) power to components of UE 1300.

The features, benefits and/or functions described herein can be implemented in one of the components of UE 1300 or partitioned across multiple components of UE 1300. Further, the features, benefits, and/or functions described herein can be implemented in any combination of hardware, software or firmware. In one example, communication subsystem 1331 can be configured to include any of the components described herein. Further, processing circuitry 1301 can be configured to communicate with any of such components over bus 1302. In another example, any of such components can be represented by program instructions stored in memory that when executed by processing circuitry 1301 perform the corresponding functions described herein. In another example, the functionality of any of such components can be partitioned between processing circuitry 1301 and communication subsystem 1331. In another example, the non-computationally intensive functions of any of such components can be implemented in software or firmware and the computationally intensive functions can be implemented in hardware.

Figure 14:
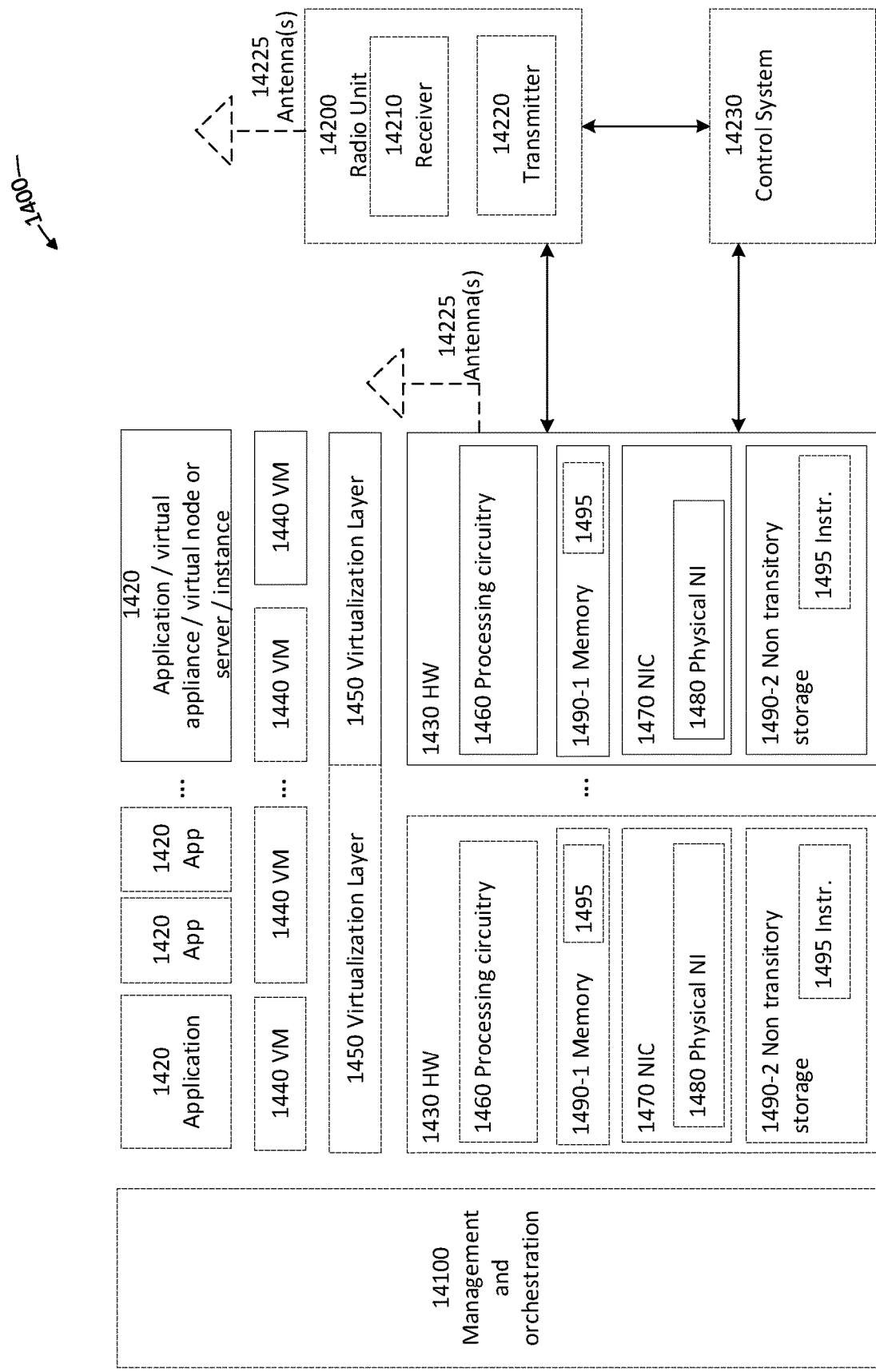
FIG. 14 is a block diagram of illustrating a virtualization environment that can facilitate virtualization of various functions implemented according to various exemplary embodiments of the present disclosure.

FIG. 14 is a schematic block diagram illustrating a virtualization environment 1400 in which functions implemented by some exemplary embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some exemplary embodiments, some or all of the functions described herein can be implemented as virtual components executed by one or more virtual machines implemented in one or more virtual environments 1400 hosted by one or more of hardware nodes 1430. Further, in embodiments in which the virtual node is not a radio access node or does not require radio connectivity (e.g., a core network node), then the network node can be entirely virtualized.

The functions can be implemented by one or more applications 1420 (which can alternatively be called software instances, virtual appliances, network functions, virtual nodes, virtual network functions, etc.) operative to implement some of the features, functions, and/or benefits of some of the embodiments disclosed herein. Applications 1420 are run in virtualization environment 1400 which provides hardware 1430 comprising processing circuitry 1460 and memory 1490. Memory 1490 contains instructions 1495 executable by processing circuitry 1460 whereby application 1420 is operative to provide one or more of the features, benefits, and/or functions disclosed herein.

Virtualization environment 1400, comprises general-purpose or special-purpose network hardware devices 1430 comprising a set of one or more processors or processing circuitry 1460, which can be commercial off-the-shelf (COTS) processors, dedicated Application Specific Integrated Circuits (ASICs), or any other type of processing circuitry including digital or analog hardware components or special purpose processors. Each hardware device can comprise memory 1490-1 which can be non-persistent memory for temporarily storing instructions 1495 or software executed by processing circuitry 1460. Each hardware device can comprise one or more network interface controllers (NICs) 1470, also known as network interface cards, which include physical network interface 1480. Each hardware device can also include non-transitory, persistent, machine-readable storage media 1490-2 having stored therein software 1495 and/or instructions executable by processing circuitry 1460.

Software 1495 can include any type of software including software for instantiating one or more virtualization layers 1450 (also referred to as hypervisors), software to execute virtual machines 1440 as well as software allowing it to execute functions, features and/or benefits described in relation with some exemplary embodiments described herein.

Virtual machines 1440, comprise virtual processing, virtual memory, virtual networking or interface and virtual storage, and can be run by a corresponding virtualization layer 1450 or hypervisor. Different embodiments of the instance of virtual appliance 1420 can be implemented on one or more of virtual machines 1440, and the implementations can be made in different ways.

During operation, processing circuitry 1460 executes software 1495 to instantiate the hypervisor or virtualization layer 1450, which can sometimes be referred to as a virtual machine monitor (VMM). Virtualization layer 1450 can present a virtual operating platform that appears like networking hardware to virtual machine 1440.

As shown in FIG. 14, hardware 1430 can be a standalone network node with generic or specific components. Hardware 1430 can comprise antenna 14225 and can implement some functions via virtualization. Alternatively, hardware 1430 can be part of a larger cluster of hardware (e.g. such as in a data center or customer premise equipment (CPE)) where many hardware nodes work together and are managed via management and orchestration (MANO) 14100, which, among others, oversees lifecycle management of applications 1420.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1440 can be a software implementation of a physical machine that runs programs as if they were executing on a physical, non-virtualized machine. Each of virtual machines 1440, and that part of hardware 1430 that executes that virtual machine, be it hardware dedicated to that virtual machine and/or hardware shared by that virtual machine with others of the virtual machines 1440, forms a separate virtual network elements (VNE).

Still in the context of NFV, Virtual Network Function (VNF) is responsible for handling specific network functions that run in one or more virtual machines 1440 on top of hardware networking infrastructure 1430 and corresponds to application 1420 in FIG. 14.

In some exemplary embodiments, one or more radio units 14200 that each include one or more transmitters 14220 and one or more receivers 14210 can be coupled to one or more antennas 14225. Radio units 14200 can communicate directly with hardware nodes 1430 via one or more appropriate network interfaces and can be used in combination with the virtual components to provide a virtual node with radio capabilities, such as a radio access node or a base station.

In some exemplary embodiments, some signalling can be effected with the use of control system 14230 which can alternatively be used for communication between the hardware nodes 1430 and radio units 14200.

Figure 15:
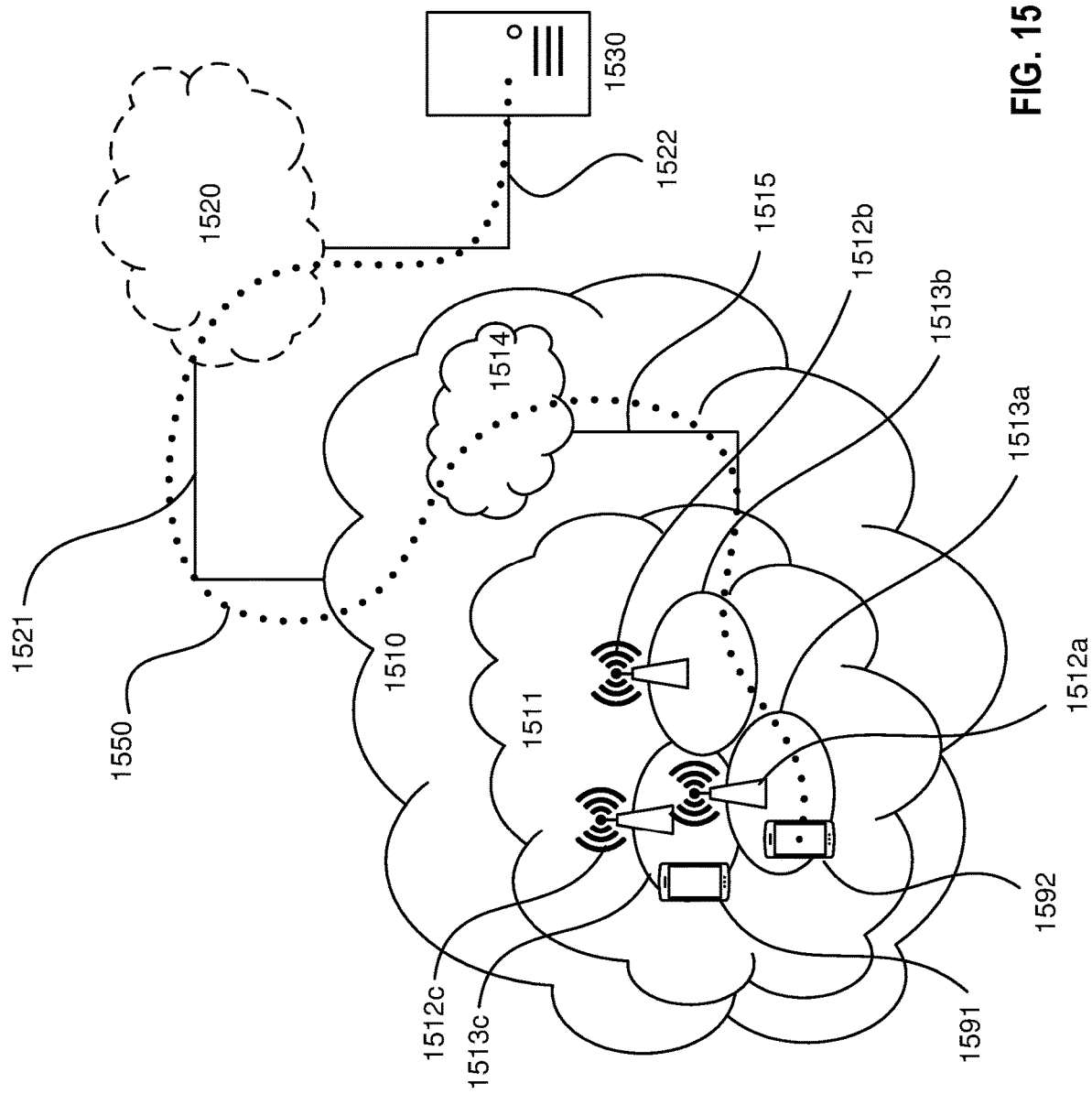
FIGS. 15-16 are block diagrams of exemplary communication systems configurable according to various exemplary embodiments of the present disclosure.

With reference FIG. 15, in accordance with an embodiment, a communication system includes telecommunication network 1510, such as a 3GPP-type cellular network, which comprises access network 1511, such as a radio access network, and core network 1514. Access network 1511 comprises a plurality of base stations 1512*a*, 1512*b*, 1512*c*, such as NBs, eNBs, gNBs or other types of wireless access points, each defining a corresponding coverage area 1513*a*, 1513*b*, 1513*c*. Each base station 1512*a*, 1512*b*, 1512*c* is connectable to core network 1514 over a wired or wireless connection 1515. A first UE 1591 located in coverage area 1513*c* can be configured to wirelessly connect to, or be paged by, the corresponding base station 1512*c*. A second UE 1592 in coverage area 1513*a* is wirelessly connectable to the corresponding base station 1512*a*. While a plurality of UEs 1591, 1592 are illustrated in this example, the disclosed embodiments are equally applicable to a situation where a sole UE is in the coverage area or where a sole UE is connecting to the corresponding base station 1512.

Telecommunication network 1510 is itself connected to host computer 1530, which can be embodied in the hardware and/or software of a standalone server, a cloud-implemented server, a distributed server or as processing resources in a server farm. Host computer 1530 can be under the ownership or control of a service provider, or can be operated by the service provider or on behalf of the service provider. Connections 1521 and 1522 between telecommunication network 1510 and host computer 1530 can extend directly from core network 1514 to host computer 1530 or can go via an optional intermediate network 1520. Intermediate network 1520 can be one of, or a combination of more than one of, a public, private or hosted network; intermediate network 1520, if any, can be a backbone network or the Internet; in particular, intermediate network 1520 can comprise two or more sub-networks (not shown).

The communication system of FIG. 15 as a whole enables connectivity between the connected UEs 1591, 1592 and host computer 1530. The connectivity can be described as an over-the-top (OTT) connection 1550. Host computer 1530 and the connected UEs 1591, 1592 are configured to communicate data and/or signaling via OTT connection 1550, using access network 1511, core network 1514, any intermediate network 1520 and possible further infrastructure (not shown) as intermediaries. OTT connection 1550 can be transparent in the sense that the participating communication devices through which OTT connection 1550 passes are unaware of routing of uplink and downlink communications. For example, base station 1512 may not or need not be informed about the past routing of an incoming downlink communication with data originating from host computer 1530 to be forwarded (e.g., handed over) to a connected UE 1591. Similarly, base station 1512 need not be aware of the future routing of an outgoing uplink communication originating from the UE 1591 towards the host computer 1530.

Example implementations, in accordance with an embodiment, of the UE, base station and host computer discussed in the preceding paragraphs will now be described with reference to FIG. 16. In communication system 1600, host computer 1610 comprises hardware 1615 including communication interface 1616 configured to set up and maintain a wired or wireless connection with an interface of a different communication device of communication system 1600. Host computer 1610 further comprises processing circuitry 1618, which can have storage and/or processing capabilities. In particular, processing circuitry 1618 can comprise one or more programmable processors, application-specific integrated circuits, field programmable gate arrays or combinations of these (not shown) adapted to execute instructions. Host computer 1610 further comprises software 1611, which is stored in or accessible by host computer 1610 and executable by processing circuitry 1618. Software 1611 includes host application 1612. Host application 1612 can be operable to provide a service to a remote user, such as UE 1630 connecting via OTT connection 1650 terminating at UE 1630 and host computer 1610. In providing the service to the remote user, host application 1612 can provide user data which is transmitted using OTT connection 1650.

Communication system 1600 can also include base station 1620 provided in a telecommunication system and comprising hardware 1625 enabling it to communicate with host computer 1610 and with UE 1630. Hardware 1625 can include communication interface 1626 for setting up and maintaining a wired or wireless connection with an interface of a different communication device of communication system 1600, as well as radio interface 1627 for setting up and maintaining at least wireless connection 1670 with UE 1630 located in a coverage area (not shown in FIG. 16) served by base station 1620. Communication interface 1626 can be configured to facilitate connection 1660 to host computer 1610. Connection 1660 can be direct or it can pass through a core network (not shown in FIG. 16) of the telecommunication system and/or through one or more intermediate networks outside the telecommunication system. In the embodiment shown, hardware 1625 of base station 1620 can also include processing circuitry 1628, which can comprise one or more programmable processors, application-specific integrated circuits, field programmable gate arrays or combinations of these (not shown) adapted to execute instructions. Base station 1620 further has software 1621 stored internally or accessible via an external connection.

Communication system 1600 can also include UE 1630 already referred to. Its hardware 1635 can include radio interface 1637 configured to set up and maintain wireless connection 1670 with a base station serving a coverage area in which UE 1630 is currently located. Hardware 1635 of UE 1630 can also include processing circuitry 1638, which can comprise one or more programmable processors, application-specific integrated circuits, field programmable gate arrays or combinations of these (not shown) adapted to execute instructions. UE 1630 further comprises software 1631, which is stored in or accessible by UE 1630 and executable by processing circuitry 1638. Software 1631 includes client application 1632. Client application 1632 can be operable to provide a service to a human or non-human user via UE 1630, with the support of host computer 1610. In host computer 1610, an executing host application 1612 can communicate with the executing client application 1632 via OTT connection 1650 terminating at UE 1630 and host computer 1610. In providing the service to the user, client application 1632 can receive request data from host application 1612 and provide user data in response to the request data. OTT connection 1650 can transfer both the request data and the user data. Client application 1632 can interact with the user to generate the user data that it provides.

Figure 16:
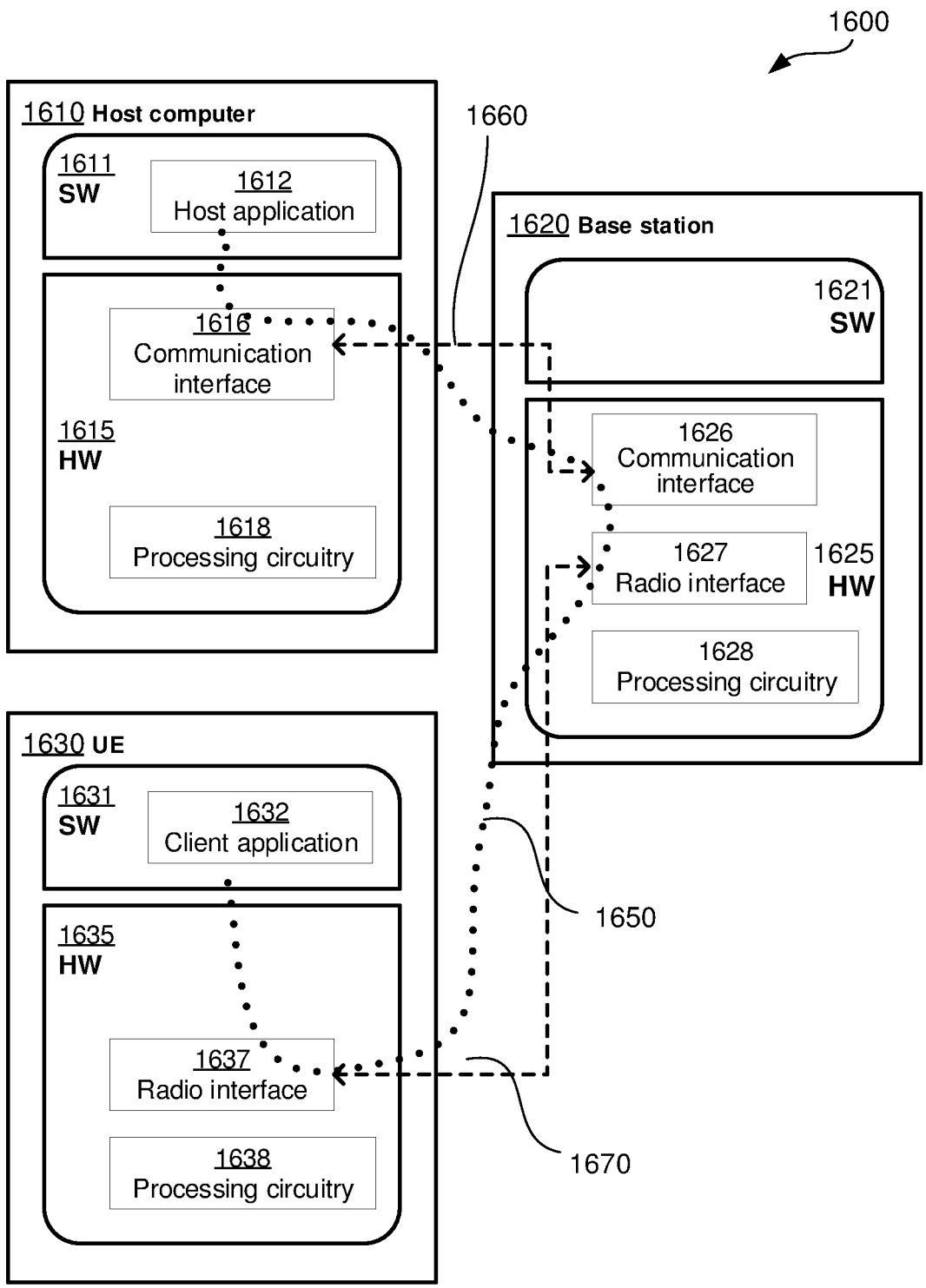

It is noted that host computer 1610, base station 1620 and UE 1630 illustrated in FIG. 16 can be similar or identical to host computer 1530, one of base stations 1512*a*, 1512*b*, 1512*c* and one of UEs 1591, 1592 of FIG. 15, respectively. This is to say, the inner workings of these entities can be as shown in FIG. 16 and independently, the surrounding network topology can be that of FIG. 15.

In FIG. 16, OTT connection 1650 has been drawn abstractly to illustrate the communication between host computer 1610 and UE 1630 via base station 1620, without explicit reference to any intermediary devices and the precise routing of messages via these devices. Network infrastructure can determine the routing, which it can be configured to hide from UE 1630 or from the service provider operating host computer 1610, or both. While OTT connection 1650 is active, the network infrastructure can further take decisions by which it dynamically changes the routing (e.g., on the basis of load balancing consideration or reconfiguration of the network).

Wireless connection 1670 between UE 1630 and base station 1620 is in accordance with the teachings of the embodiments described throughout this disclosure. One or more of the various embodiments improve the performance of OTT services provided to UE 1630 using OTT connection 1650, in which wireless connection 1670 forms the last segment. More precisely, the exemplary embodiments disclosed herein improve transmission and reception of sounding reference signals (SRS) that are used to acquire channel state information (CSI) for uplink and, optionally, downlink channels. Such CSI is essential for proper configuration of VL-MIMO solutions that are known to provide benefits including, but not limited to: increased data rate and/or throughput on downlink or uplink; increased coverage at a given data rate; reduced latency in transmission, reception, and/or processing of data; increased capacity in terms of the number of users in a geographic area who can access and/or utilize a particular service via the wireless network.

A measurement procedure can be provided for the purpose of monitoring data rate, latency and other network operational aspects on which the one or more embodiments improve. There can further be an optional network functionality for reconfiguring OTT connection 1650 between host computer 1610 and UE 1630, in response to variations in the measurement results. The measurement procedure and/or the network functionality for reconfiguring OTT connection 1650 can be implemented in software 1611 and hardware 1615 of host computer 1610 or in software 1631 and hardware 1635 of UE 1630, or both. In embodiments, sensors (not shown) can be deployed in or in association with communication devices through which OTT connection 1650 passes; the sensors can participate in the measurement procedure by supplying values of the monitored quantities exemplified above, or supplying values of other physical quantities from which software 1611, 1631 can compute or estimate the monitored quantities. The reconfiguring of OTT connection 1650 can include message format, retransmission settings, preferred routing etc.; the reconfiguring need not affect base station 1620, and it can be unknown or imperceptible to base station 1620. Such procedures and functionalities can be known and practiced in the art. In certain embodiments, measurements can involve proprietary UE signaling facilitating host computer 1610's measurements of throughput, propagation times, latency and the like. The measurements can be implemented in that software 1611 and 1631 causes messages to be transmitted, in particular empty or 'dummy' messages, using OTT connection 1650 while it monitors propagation times, errors etc.

Figures 17, 18:
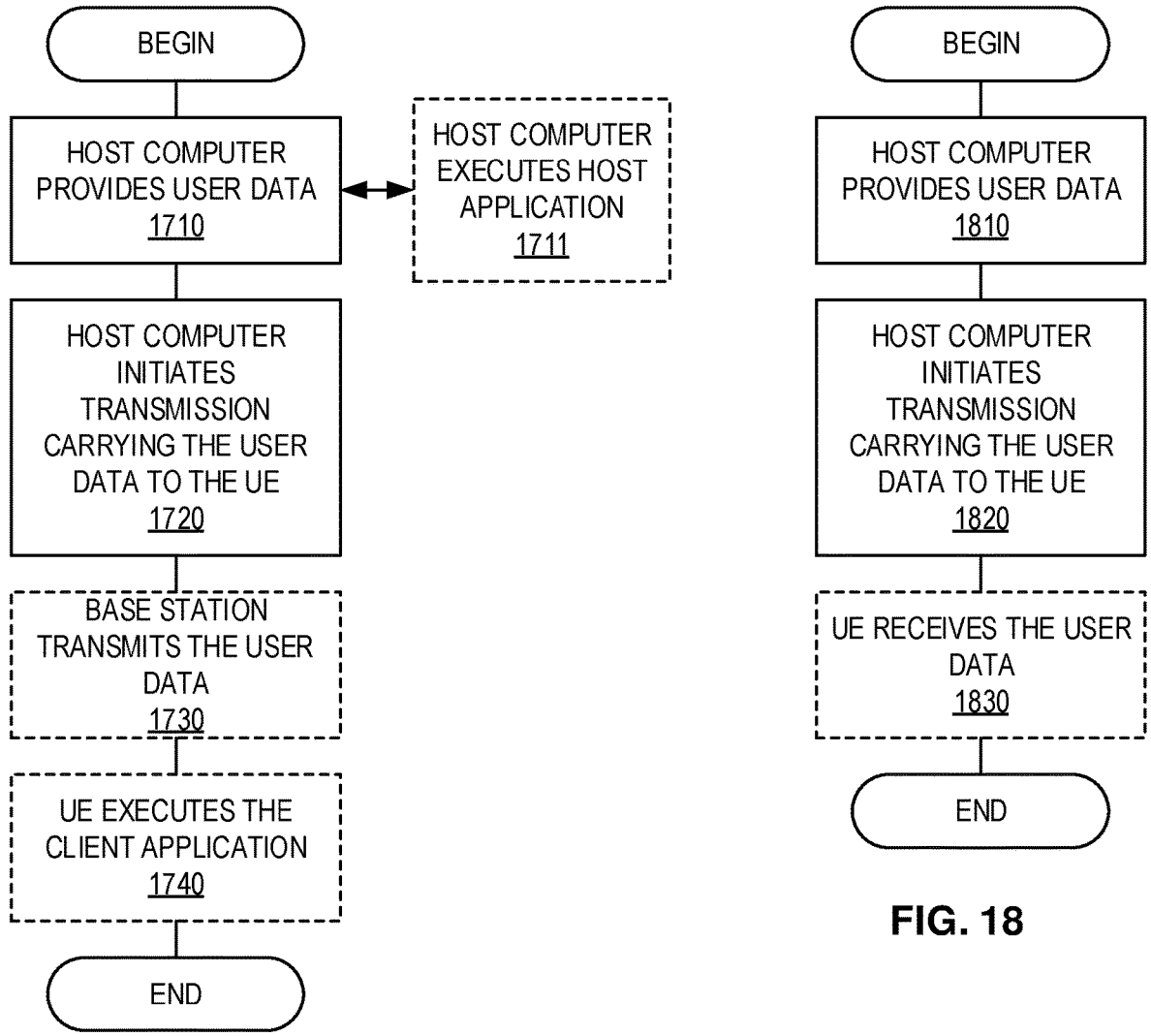

FIG. 17 is a flowchart illustrating an exemplary method and/or procedure implemented in a communication system, in accordance with one embodiment. The communication system includes a host computer, a base station and a UE which, in some exemplary embodiments, can be those described with reference to FIGS. 12-15*d*. For simplicity of the present disclosure, only drawing references to FIG. 17 will be included in this section. In step 1710, the host computer provides user data. In substep 1711 (which can be optional) of step 1710, the host computer provides the user data by executing a host application. In step 1720, the host computer initiates a transmission carrying the user data to the UE. In step 1730 (which can be optional), the base station transmits to the UE the user data which was carried in the transmission that the host computer initiated, in accordance with the teachings of the embodiments described throughout this disclosure. In step 1740 (which can also be optional), the UE executes a client application associated with the host application executed by the host computer.

FIG. 18 is a flowchart illustrating an exemplary method and/or procedure implemented in a communication system, in accordance with one embodiment. The communication system includes a host computer, a base station and a UE which can be those described with reference to FIGS. 12-16. For simplicity of the present disclosure, only drawing references to FIG. 18 will be included in this section. In step 1810 of the method, the host computer provides user data. In an optional substep (not shown) the host computer provides the user data by executing a host application. In step 1820, the host computer initiates a transmission carrying the user data to the UE. The transmission can pass via the base station, in accordance with the teachings of the embodiments described throughout this disclosure. In step 1830 (which can be optional), the UE receives the user data carried in the transmission.

FIG. 19 is a flowchart illustrating an exemplary method and/or procedure implemented in a communication system, in accordance with one embodiment. The communication system includes a host computer, a base station and a UE which can be those described with reference to FIGS. 12-15. For simplicity of the present disclosure, only drawing references to FIG. 19 will be included in this section. In step 1910 (which can be optional), the UE receives input data provided by the host computer. Additionally or alternatively, in step 1920, the UE provides user data. In substep 1921 (which can be optional) of step 1920, the UE provides the user data by executing a client application. In substep 1911 (which can be optional) of step 1910, the UE executes a client application which provides the user data in reaction to the received input data provided by the host computer. In providing the user data, the executed client application can further consider user input received from the user. Regardless of the specific manner in which the user data was provided, the UE initiates, in substep 1930 (which can be optional), transmission of the user data to the host computer. In step 1940 of the method, the host computer receives the user data transmitted from the UE, in accordance with the teachings of the embodiments described throughout this disclosure.

FIG. 20 is a flowchart illustrating an exemplary method and/or procedure implemented in a communication system, in accordance with one embodiment. The communication system includes a host computer, a base station and a UE which can be those described with reference to FIGS. 12-15. For simplicity of the present disclosure, only drawing references to FIG. 20 will be included in this section. In step 2010 (which can be optional), in accordance with the teachings of the embodiments described throughout this disclosure, the base station receives user data from the UE. In step 2020 (which can be optional), the base station initiates transmission of the received user data to the host computer. In step 2030 (which can be optional), the host computer receives the user data carried in the transmission initiated by the base station.

The term unit can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

As used herein unless expressly stated to the contrary, the phrases "at least one of" and "one or more of," followed by a conjunctive list of enumerated items (e.g., "A and B", "A, B, and C"), are intended to mean "at least one item, with each item selected from the list consisting of" the enumerated items. For example, "at least one of A and B" is intended to mean any of the following: A; B; A and B. Likewise, "one or more of A, B, and C" is intended to mean any of the following: A; B; C; A and B; B and C; A and C; A, B, and C.

As used herein unless expressly stated to the contrary, the phrase "a plurality of" followed by a conjunctive list of enumerated items (e.g., "A and B", "A, B, and C") is intended to mean "multiple items, with each item selected from the list consisting of" the enumerated items. For example, "a plurality of A and B" is intended to mean any of the following: more than one A; more than one B; or at least one A and at least one B.

Some exemplary embodiments include:

1. A method for operating a wireless device in communication with a first network node, the method comprising:
   receiving, from the first network node, an indication of at least one repetition method used in a broadcast channel transmitted by a second network node, wherein the repetition method comprises:
   i. a first portion of an information block in first resources of the broadcast channel that are reserved for the information block; and
   ii. a second portion of the information block, comprising at least a subset of the first portion, in second resources of the broadcast channel that are different from the first resources;
   receiving the broadcast channel transmitted by the second network node;
   decoding the information block by combining the first portion and the second portion.

2. The method of embodiment 1, wherein the indication comprises a multi-bit field that indicates one of a plurality of available repetition methods.

3. The method of embodiment 1, wherein:
   the broadcast channel is a narrowband physical broadcast channel (NPBCH);
   the information block is a narrowband master information block (MIB-NB);
   the first resources comprise at least a portion of symbols 3-13 of a physical resource block (PRB); and
   the second resources comprise at least a portion of symbols 0-2 of the PRB.

4. The method of embodiment 3, wherein the indication identifies a first repetition method comprising repeating a subset of the first portion of the MIB-NB in the second resources.

5. The method of embodiment 3, wherein:
   the first portion of the MIB-NB is coded at a first rate;
   the second portion comprises the first portion of the MIB-NB coded at a second rate greater than the first rate;
   the indication identifies a second repetition method comprising repeating the first portion of the MIB-NB coded at the second rate in the second resources.

6. The method of embodiment 5, wherein combining the first portion and the second portion comprises rate-matching the first portion and the second portion.

7. The method of any of embodiments 1-6, further comprising: performing one or more measurements related to the second network node; and transmitting information concerning the one or more measurements to the first network node.

8. The method of any of embodiments 1-8, wherein the second resources are not reserved for the information block.

9. A method performed by a first network node in communication with a wireless device, the method comprising:
   receiving information identifying at least one repetition method used in a broadcast channel transmitted by a second network node, wherein the repetition method comprises:
   i. a first portion of an information block in first resources of the broadcast channel that are reserved for the information block; and
   ii. a second portion of the information block, comprising at least a subset of the first portion, in second resources of the broadcast channel that are different from the first resources;
   sending, to the wireless device, an indication of the at least one repetition method; and receiving information concerning one or more measurements, related to the second network node, made by the wireless device subsequent to acquiring the information broadcast by the second network node.

10. The method of embodiment 9, wherein the indication comprises a multi-bit field that indicates one of a plurality of available repetition methods.

11. The method of embodiment 9, wherein:
the broadcast channel is a narrowband physical broadcast channel (NPBCH);
the information block is a narrowband master information block (MIB-NB);
the first resources comprise at least a portion of symbols 3-13 of a physical resource block (PRB); and
the second resources comprise at least a portion of symbols 0-2 of the PRB.

12. The method of embodiment 11, wherein the indication identifies a first repetition method comprising repeating a subset of the first portion of the MIB-NB in the second resources.

13. The method of embodiment 11, wherein:
the first portion of the MIB-NB is coded at a first rate;
the second portion comprises the first portion of the MIB-NB coded at a second rate greater than the first rate;
the indication identifies a second repetition method comprising repeating the first portion of the MIB-NB coded at the second rate in the second resources.

14. The method of any of embodiments 9-13, wherein sending the indication of the at least one repetition method is conditioned upon enhanced coverage with respect to the wireless device.

15. The method of any of embodiments 9-13, wherein sending the indication of the at least one repetition method is conditioned upon an expected mobility for the wireless device.

16. The method of any of embodiments 9-15, wherein the second resources are not reserved for the information block.

17. A method performed by a second network node for transmitting a broadcast channel, the method comprising:
selecting a first repetition method for transmitting the broadcast channel, wherein the repetition method comprises:
i. a first portion of an information block in first resources of the broadcast channel that are reserved for the information block; and
ii. a second portion of the information block, comprising at least a subset of the first portion, in second resources of the broadcast channel that are different from the first resources;
sending, to a first network node, an indication of the first repetition method; and
transmitting the broadcast channel in accordance with the first repetition method.

18. The method of embodiment 17, wherein the indication comprises a multi-bit field that indicates one of a plurality of available repetition methods.

19. The method of embodiment 17, wherein:
the broadcast channel is a narrowband physical broadcast channel (NPBCH);
the information block is a narrowband master information block (MIB-NB);
the first resources comprise at least a portion of symbols 3-13 of a physical resource block (PRB); and
the second resources comprise at least a portion of symbols 0-2 of the PRB.

20. The method of embodiment 17, wherein the indication identifies a first repetition method comprising repeating a subset of the first portion of the MIB-NB in the second resources.

21. The method of embodiment 19, wherein:
the first portion of the MIB-NB is coded at a first rate;
the second portion comprises the first portion of the MIB-NB coded at a second rate greater than the first rate;
the indication identifies a second repetition method comprising repeating the first portion of the MIB-NB coded at the second rate in the second resources.

22. The method of any of embodiments 17-21, wherein selecting the first repetition method is based on enhanced coverage with respect to the wireless device.

23. The method of any of embodiments 17-21, further comprising refraining from transmitting one or more further channels in the second resources.

24. The method of any of embodiments 17-23, wherein the second resources are not reserved for the information block.

25. A wireless device comprising:
processing circuitry configured to perform operations corresponding to any of the methods of embodiments 1-8; and
power supply circuitry configured to supply power to the wireless device.

26. A base station comprising:
processing circuitry configured to perform operations corresponding to any of the methods of embodiments 9-24;
power supply circuitry configured to supply power to the base station.

27. A user equipment (UE) comprising:
an antenna configured to send and receive wireless signals;
radio front-end circuitry connected to the antenna and to processing circuitry, and configured to condition signals communicated between the antenna and the processing circuitry;
the processing circuitry being configured to perform operations corresponding to any of the methods of embodiments 1-8;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

28. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform operations corresponding to any of the methods of embodiments 9-24.

29. The communication system of embodiment 28 further including the base station.

30. The communication system of any of embodiments 28-29, further including the UE, wherein the UE is configured to communicate with the base station.

31. The communication system of any of embodiments 28-30, wherein:
    the processing circuitry of the host computer is configured to execute a host application, thereby providing the user data; and
    the UE comprises processing circuitry configured to execute a client application associated with the host application.

32. A method implemented in a communication system including a host computer, a base station and a user equipment (UE), the method comprising:
    at the host computer, providing user data; and
    at the host computer, initiating a transmission carrying the user data to the UE via a cellular network comprising the base station, wherein the base station performs operations corresponding to any of methods of embodiments 9-24.

33. The method of embodiment 32, further comprising, at the base station, transmitting the user data.

34. The method of any of embodiments 32-33, wherein the user data is provided at the host computer by executing a host application, the method further comprising, at the UE, executing a client application associated with the host application.

35. A user equipment (UE) configured to communicate with a base station, the UE comprising a radio interface and processing circuitry configured to perform operations corresponding to any of the methods of embodiments 32-34.

36. A communication system including a host computer comprising:
    processing circuitry configured to provide user data; and
    a communication interface configured to forward user data to a cellular network for transmission to a user equipment (UE),
    wherein the UE comprises a radio interface and processing circuitry, the UE's components configured to perform operations corresponding to any of the methods of embodiments 1-8.

37. The communication system of the previous embodiment, wherein the cellular network can also include a base station configured to communicate with the UE.

38. The communication system of any of embodiments 36-37, wherein:
    the processing circuitry of the host computer is configured to execute a host application, thereby providing the user data; and
    the UE's processing circuitry is configured to execute a client application associated with the host application.

39. A method implemented in a communication system including a host computer, a base station and a user equipment (UE), the method comprising:
    at the host computer, providing user data; and
    at the host computer, initiating a transmission carrying the user data to the UE via a cellular network comprising the base station, wherein the UE performs operations corresponding to any of the methods of embodiments 1-8.

40. The method of embodiment 35, further comprising at the UE, receiving the user data from the base station.

41. A communication system including a host computer comprising:
    communication interface configured to receive user data originating from a transmission from a user equipment (UE) to a base station,
    wherein the UE comprises a radio interface and processing circuitry, the UE's processing circuitry configured to perform operations corresponding to any of the methods of embodiments 1-8.

42. The communication system of the previous embodiment, further including the UE.

43. The communication system of any of embodiments 41-42, further including the base station, wherein the base station comprises a radio interface configured to communicate with the UE and a communication interface configured to forward to the host computer the user data carried by a transmission from the UE to the base station.

44. The communication system of any of embodiments 41-43, wherein:
    the processing circuitry of the host computer is configured to execute a host application; and
    the UE's processing circuitry is configured to execute a client application associated with the host application, thereby providing the user data.

45. The communication system of any of embodiments 41-44, wherein:
    the processing circuitry of the host computer is configured to execute a host application, thereby providing request data; and
    the UE's processing circuitry is configured to execute a client application associated with the host application, thereby providing the user data in response to the request data.

46. A method implemented in a communication system including a host computer, a base station and a user equipment (UE), the method comprising:
    at the host computer, receiving user data transmitted to the base station from the UE, wherein the UE performs operations corresponding to any of the methods of embodiments 1-8.

47. The method of embodiment 46, further comprising, at the UE, providing the user data to the base station.

48. The method of any of embodiments 46-47, further comprising:
    at the UE, executing a client application, thereby providing the user data to be transmitted; and
    at the host computer, executing a host application associated with the client application.

49. The method of any of embodiments 46-48, further comprising:
    at the UE, executing a client application; and
    at the UE, receiving input data to the client application, the input data being provided at the host computer by executing a host application associated with the client application,
    wherein the user data to be transmitted is provided by the client application in response to the input data.

50. A communication system including a host computer comprising a communication interface configured to receive user data originating from a transmission from a user equipment (UE) to a base station, wherein the base station comprises a radio interface and processing circuitry, the base station's processing circuitry configured to perform operations corresponding to any of the methods of embodiments 9-24.

51. The communication system of embodiment 50 further including the base station.

52. The communication system of any of embodiments 50-51, further including the UE, wherein the UE is configured to communicate with the base station.

53. The communication system of any of embodiments 50-52, wherein:
    the processing circuitry of the host computer is configured to execute a host application;

the UE is configured to execute a client application associated with the host application, thereby providing the user data to be received by the host computer.

54. A method implemented in a communication system including a host computer, a base station and a user equipment (UE), the method comprising:
at the host computer, receiving, from the base station, user data originating from a transmission which the base station has received from the UE, wherein the UE performs operations corresponding to any of the methods of embodiments 1-8.

55. The method of embodiment 54, further comprising at the base station, receiving the user data from the UE.

56. The method of any of embodiments 54-55, further comprising at the base station, initiating a transmission of the received user data to the host computer.

REFERENCES

3GPP TS 36.331.
3GPP TS 36.213.

ABBREVIATIONS

At least some of the following abbreviations can be used in this disclosure. If there is an inconsistency between abbreviations, preference should be given to how it is used above. If listed multiple times below, the first listing should be preferred over any subsequent listing(s).
1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC Evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PDU Protocol Data Unit
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol (or Signal) Received Power
RSRQ Reference Symbol (or Signal) Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network
CM Cubic Metric
MIMO Multiple-input-multiple-output
AS Access Stratum
CCCH Common Control CHannel
CIoT Cellular Internet Of Things
CN Core Network
DCCH Dedicated Control CHannel
DoNAS Data over NAS
EN-DC E-UTRAN NR Dual Connectivity
EPS Evolved Packet System
ID Identity
IE Information Element
MBs Mega Bytes
NAS Non Access Stratum
NB-IoT Narrowband Internet Of Things
NE-DC NR E-UTRAN Dual Connectivity
OAM Operation and Maintenance
PCell Primary Cell
PCI Physical Cell ID
PSCell Primary SCell
PHY Physical (layer)
SgNB Secondary gNB
Rx Receiver
SCell Secondary Cell
Tx Transmitter
URLLC Ultra Reliable Low Latency Communication
BCH Broadcast channel
BLER Block error rate
CRS Cell-specific reference signal
IoT Internet of things
LPWA Low power wide area
M2M Machine to machine
MIB-NB MIB for NB-IoT
MTC Machine time communications
NB-IoT Narrowband internet of things
NPBCH Narrowband PBCH
NPSS Narrowband PSS
NRS Narrowband RS
NRSRP Narrowband RSRP
NRSRQ Narrowband RSRQ
NSSS Narrowband SSS
PRB Physical resource block
RE Resource element

What is claimed is:

1. A method for operating a wireless device in communication with a first network node, the method comprising:
receiving, from the first network node, an indication of at least one repetition method used in a broadcast channel transmitted by a second network node, wherein the repetition method comprises:
a first portion of an information block in first resources of the broadcast channel that are reserved for the information block; and
a second portion of the information block, comprising at least a subset of the first portion, in second resources of the broadcast channel that are different from the first resources;
receiving the broadcast channel transmitted by the second network node; and
decoding the information block by combining the first portion and the second portion,
the broadcast channel being a narrowband physical broadcast channel (NPBCH);
the information block being a narrowband master information block (MIB-NB);
the first resources comprising at least a portion of symbols that include the NPBCH; and
the second resources comprising at least a portion of symbols that do not include the NPBCH.

2. The method of claim 1, wherein the indicated repetition method comprises repetition of a subset of the first portion of the MIB-NB in the second resources.

3. The method of claim 1, wherein:
the first portion of the MIB-NB is coded at a first rate;
the second portion comprises the first portion of the MIB-NB coded at a second rate greater than the first rate; and
the indicated repetition method comprises repetition of the first portion of the MIB-NB coded at the second rate in the second resources.

4. The method of claim 3, wherein combining the first portion and the second portion comprises rate-matching the first portion and the second portion.

5. A wireless device comprising:
power supply circuitry configured to supply power to the first network node; and
processing circuitry configured to:
receive, from a first network node, an indication of at least one repetition method used in a broadcast channel transmitted by a second network node, wherein the repetition method comprises:
a first portion of an information block in first resources of the broadcast channel that are reserved for the information block; and
a second portion of the information block, comprising at least a subset of the first portion, in second resources of the broadcast channel that are different from the first resources;
receive the broadcast channel transmitted by the second network node; and
decode the information block by combining the first portion and the second portion,
the broadcast channel being a narrowband physical broadcast channel (NPBCH);
the information block being a narrowband master information block (MIB-NB);
the first resources comprising at least a portion of symbols that include the NPBCH; and
the second resources comprising at least a portion of symbols that do not include the NPBCH.

6. The wireless device of claim 5, wherein the indicated repetition method comprises repetition of a subset of the first portion of the MIB-NB in the second resources.

7. The wireless device of claim 5, wherein:
the first portion of the MIB-NB is coded at a first rate;
the second portion comprises the first portion of the MIB-NB coded at a second rate greater than the first rate; and
the indicated repetition method comprises repetition of the first portion of the MIB-NB coded at the second rate in the second resources.

8. The wireless device of claim 7, wherein the processing circuitry is configured to combine the first portion and the second portion by rate-matching the first portion and the second portion.

9. A method for a first network node in a wireless communication network, the method comprising:
determining at least one repetition method used in a broadcast channel transmitted by a second network node, wherein the repetition method comprises:
a first portion of an information block in first resources of the broadcast channel that are reserved for the information block; and
a second portion of the information block, comprising at least a subset of the first portion, in second resources of the broadcast channel that are different from the first resources;
sending, to a wireless device, an indication of the at least one repetition method; and
receiving information concerning one or more measurements, related to the second network node, made by the wireless device subsequent to acquiring the information broadcast by the second network node,
the broadcast channel being a narrowband physical broadcast channel (NPBCH);
the information block being a narrowband master information block (MIB-NB);
the first resources comprising at least a portion of symbols that include the NPBCH; and
the second resources comprising at least a portion of symbols that do not include the NPBCH.

10. The method of claim 9, wherein the indicated repetition method comprises repetition of a subset of the first portion of the MIB-NB in the second resources.

11. The method of claim 9, wherein:
the first portion of the MIB-NB is coded at a first rate;
the second portion comprises the first portion of the MIB-NB coded at a second rate greater than the first rate; and
the indicated repetition method comprises repetition of the first portion of the MIB-NB coded at the second rate in the second resources.

12. A first network node in wireless communication network, the first network node comprising:
power supply circuitry configured to supply power to the first network node; and
processing circuitry configured to perform operations corresponding to the method of claim 9.

13. The first network node of claim 12, wherein:
the broadcast channel is a narrowband physical broadcast channel (NPBCH);
the information block is a narrowband master information block (MIB-NB);
the first resources comprise at least a portion of symbols that include the NPBCH; and
the second resources comprise at least a portion of symbols that do not include the NPBCH.

14. The first network node of claim 13, wherein the indicated repetition method comprises repetition of a subset of the first portion of the MIB-NB in the second resources.

15. The first network node of claim 13, wherein:
the first portion of the MIB-NB is coded at a first rate;
the second portion comprises the first portion of the MIB-NB coded at a second rate greater than the first rate; and
the indicated repetition method comprises repetition of the first portion of the MIB-NB coded at the second rate in the second resources.

* * * * *